United States Patent
Hiwada et al.

(10) Patent No.: US 12,197,723 B2
(45) Date of Patent: Jan. 14, 2025

(54) MEMORY SYSTEM CONTROLLING NONVOLATILE MEMORY

(71) Applicant: Kioxia Corporation, Tokyo (JP)

(72) Inventors: Kazuhiro Hiwada, Kamakura (JP); Tomoya Suzuki, Ota (JP)

(73) Assignee: Kioxia Corporation, Tokyo (JP)

( * ) Notice: Subject to any disclaimer, the term of this patent is extended or adjusted under 35 U.S.C. 154(b) by 196 days.

(21) Appl. No.: 17/938,994

(22) Filed: Sep. 7, 2022

(65) Prior Publication Data
US 2023/0138215 A1 May 4, 2023

(30) Foreign Application Priority Data
Oct. 29, 2021 (JP) ................................. 2021-177607

(51) Int. Cl.
*G06F 3/06* (2006.01)
*G06F 12/1009* (2016.01)

(52) U.S. Cl.
CPC .......... *G06F 3/0604* (2013.01); *G06F 3/0656* (2013.01); *G06F 3/0679* (2013.01); *G06F 12/1009* (2013.01); *G06F 2212/60* (2013.01)

(58) Field of Classification Search
CPC .... G06F 3/0604; G06F 3/0656; G06F 3/0679; G06F 12/1009; G06F 2212/60; G06F 12/0868; G06F 3/061; G06F 2212/1016; G06F 2212/214; G06F 2212/261; G06F 2212/312; G06F 2212/7203; G06F 2212/7204; G06F 2212/7208; G06F 12/0246; G06F 2212/7201; Y02D 10/00
See application file for complete search history.

(56) References Cited

U.S. PATENT DOCUMENTS

| | | | |
|---|---|---|---|
| 2012/0198175 A1* | 8/2012 | Atkisson | G06F 12/0833 711/135 |
| 2013/0024641 A1* | 1/2013 | Talagala | G06F 11/3442 711/170 |
| 2017/0371559 A1* | 12/2017 | Higgins | G06F 3/0611 |
| 2018/0321878 A1* | 11/2018 | Hong | G06F 3/0616 |
| 2019/0012264 A1* | 1/2019 | Jeong | G06F 3/0658 |
| 2019/0272104 A1* | 9/2019 | Durnov | G06F 3/0673 |

(Continued)

*Primary Examiner* — Charles Rones
*Assistant Examiner* — Han V Doan
(74) *Attorney, Agent, or Firm* — Oblon, McClelland, Maier & Neustadt, L.L.P.

(57) ABSTRACT

According to one embodiment, a controller of a memory system manages $2^N$ banks obtained by dividing a logical address space, and $2^N$ regions included in a nonvolatile memory, the $2^N$ regions corresponding one-to-one to the $2^N$ banks. The controller stores an address translation table in a random access memory, the address translation table including a plurality of entries respectively corresponding to a plurality of logical addresses which are contiguous in units of a first size corresponding to granularity of data read/write-accessed by a host, the address translation table managing mapping between each of the logical addresses and each of physical addresses. The controller allocates $2^N$ write buffers to the random access memory.

20 Claims, 19 Drawing Sheets

(56) References Cited

U.S. PATENT DOCUMENTS

| | | |
|---|---|---|
| 2020/0117989 A1* | 4/2020 | Huang .............. G06F 13/1673 |
| 2020/0250090 A1 | 8/2020 | Ware et al. |
| 2020/0334169 A1 | 10/2020 | Zhang et al. |
| 2021/0109666 A1 | 4/2021 | Palmer et al. |

* cited by examiner

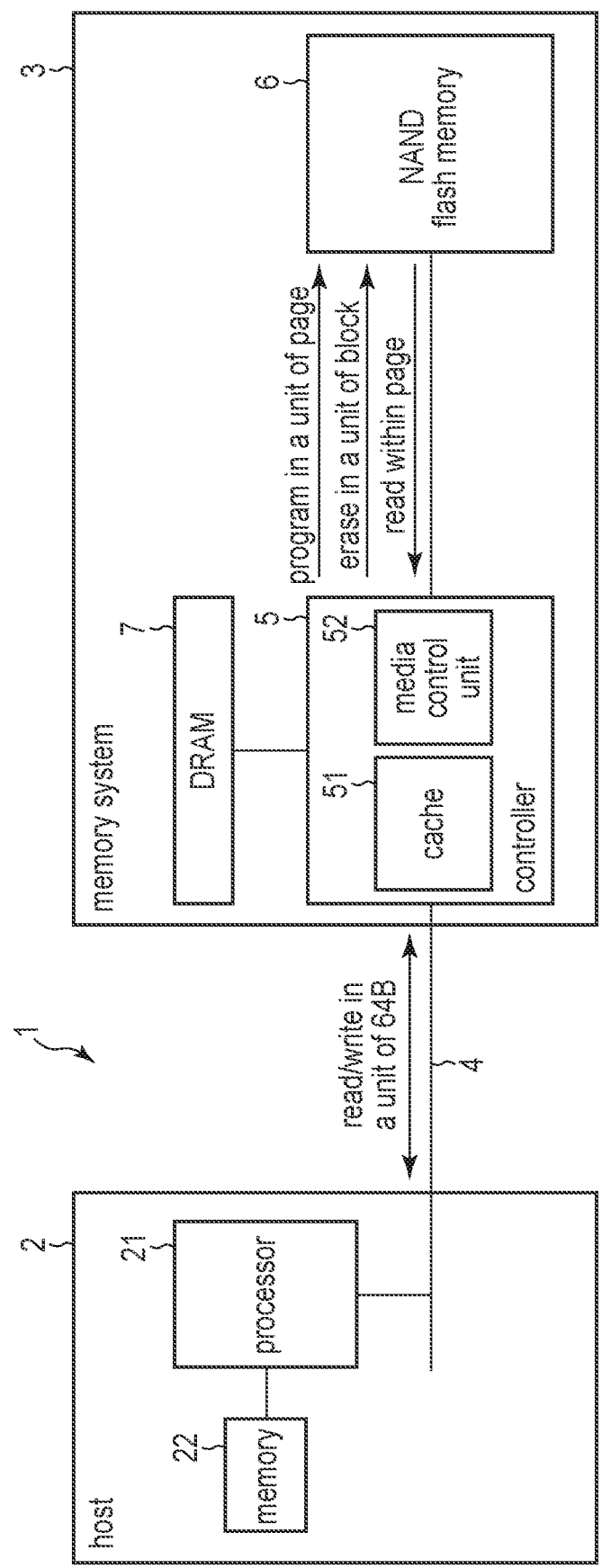
F I G. 1

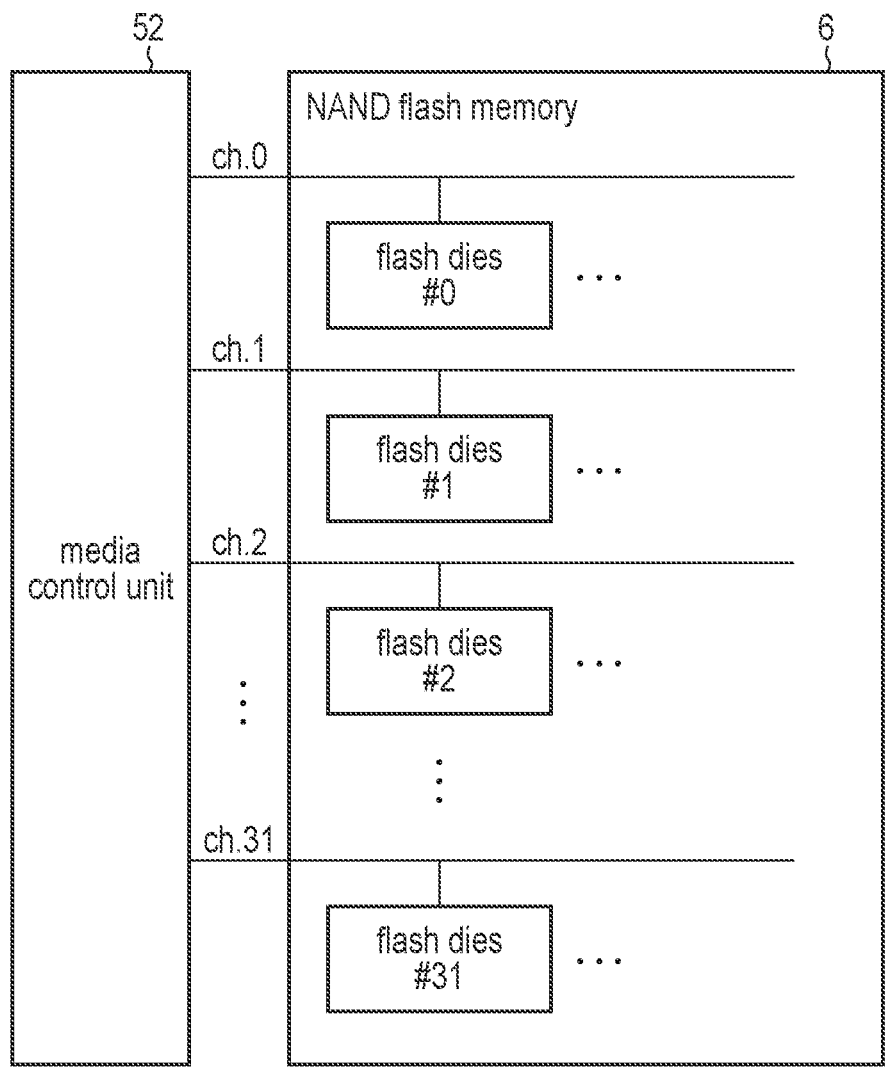
F I G. 2

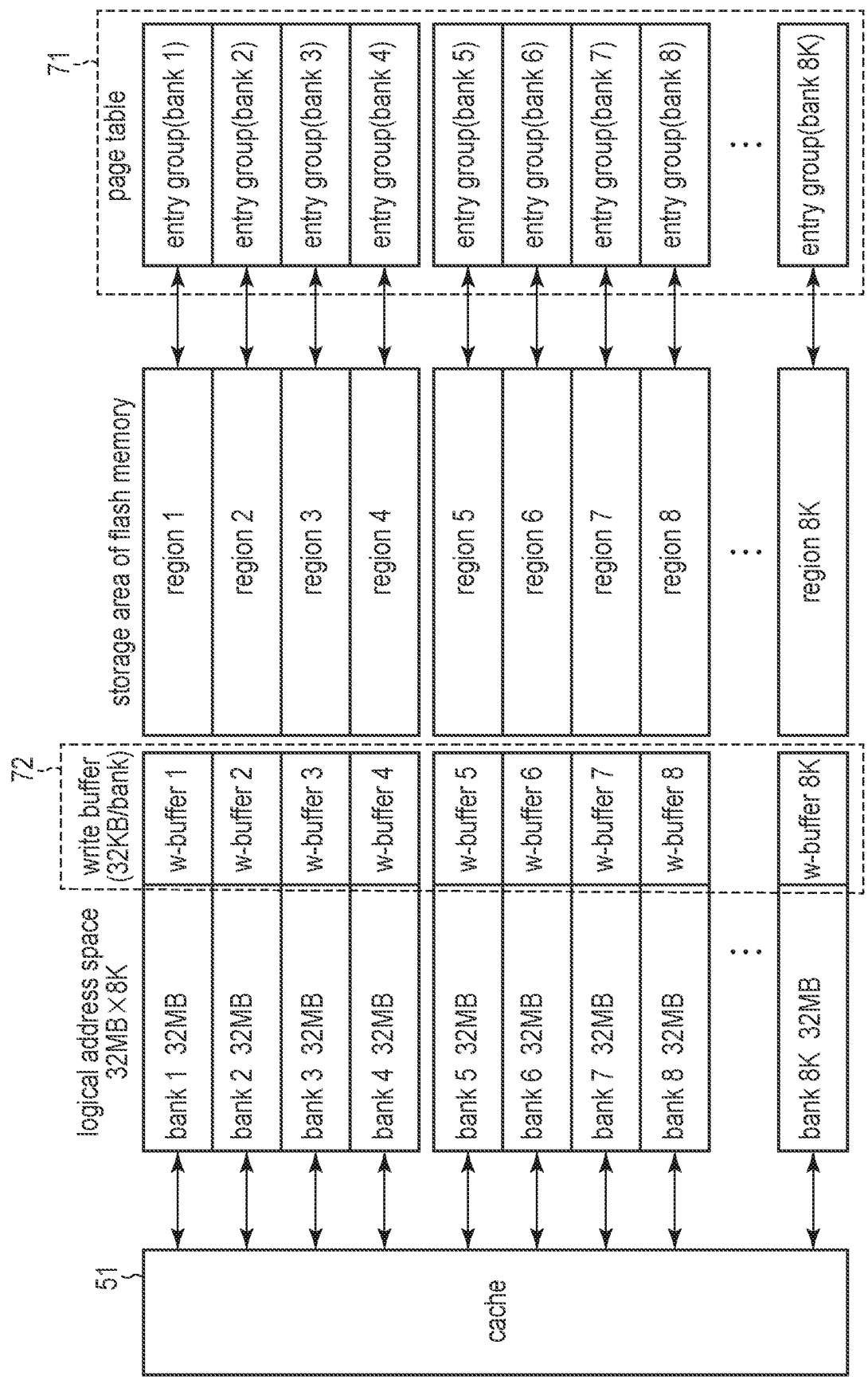
F I G. 6

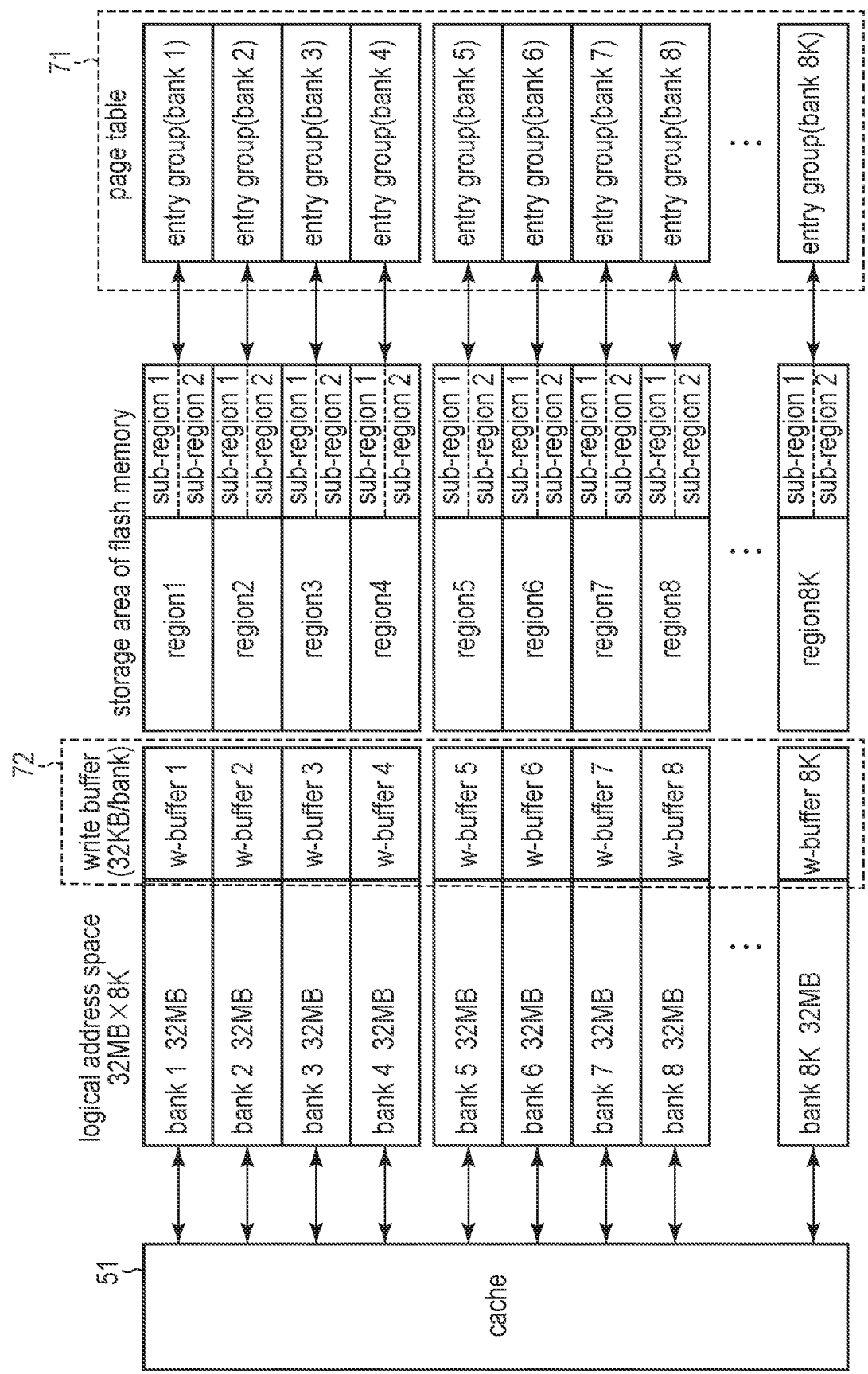
F I G. 7

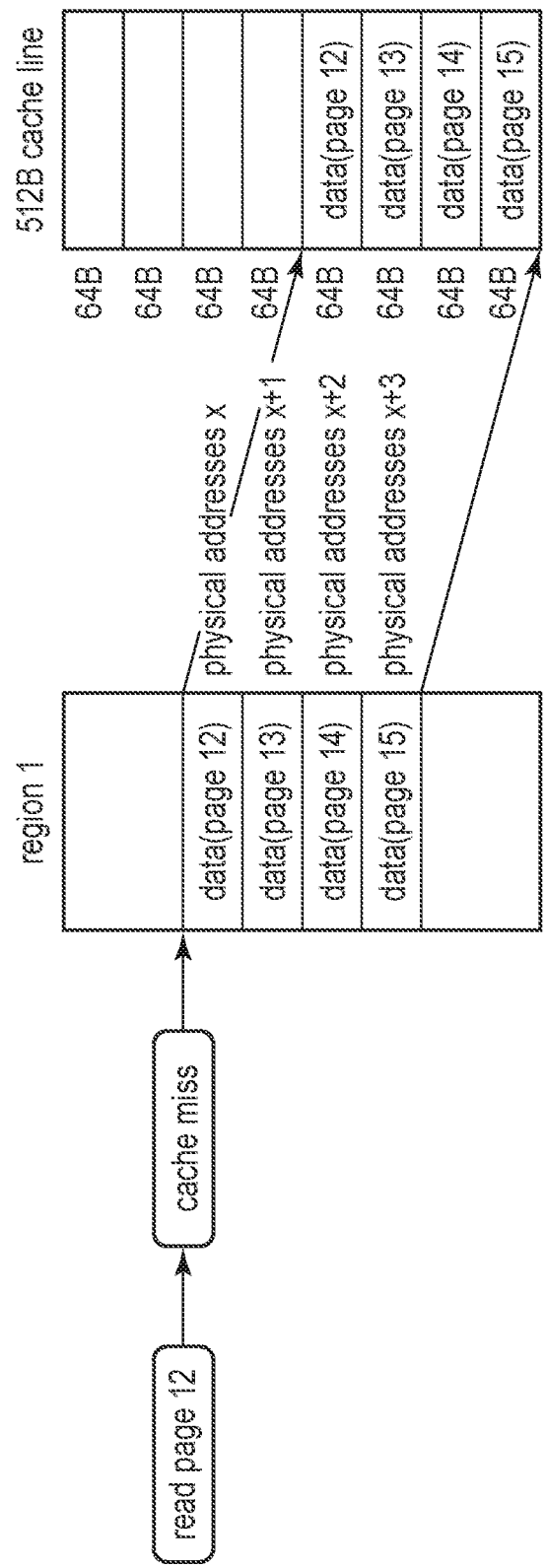
F I G. 13

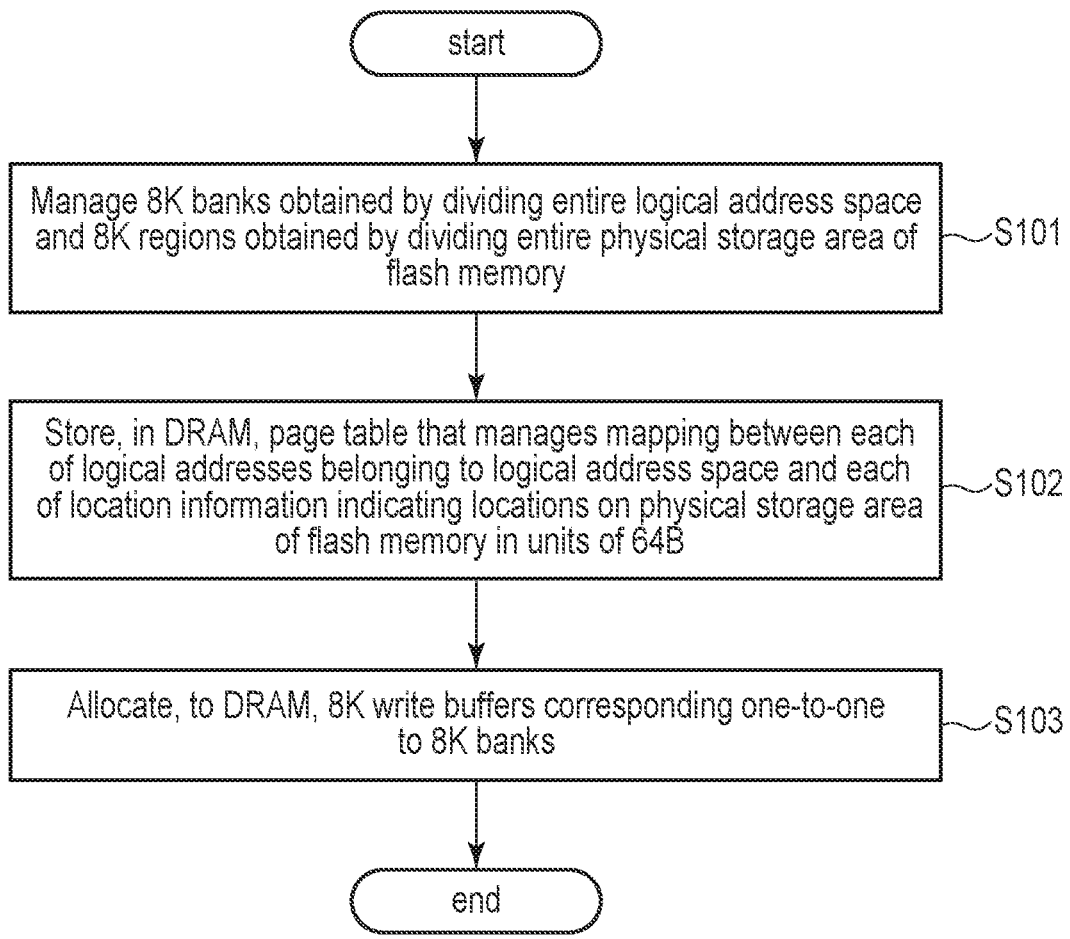

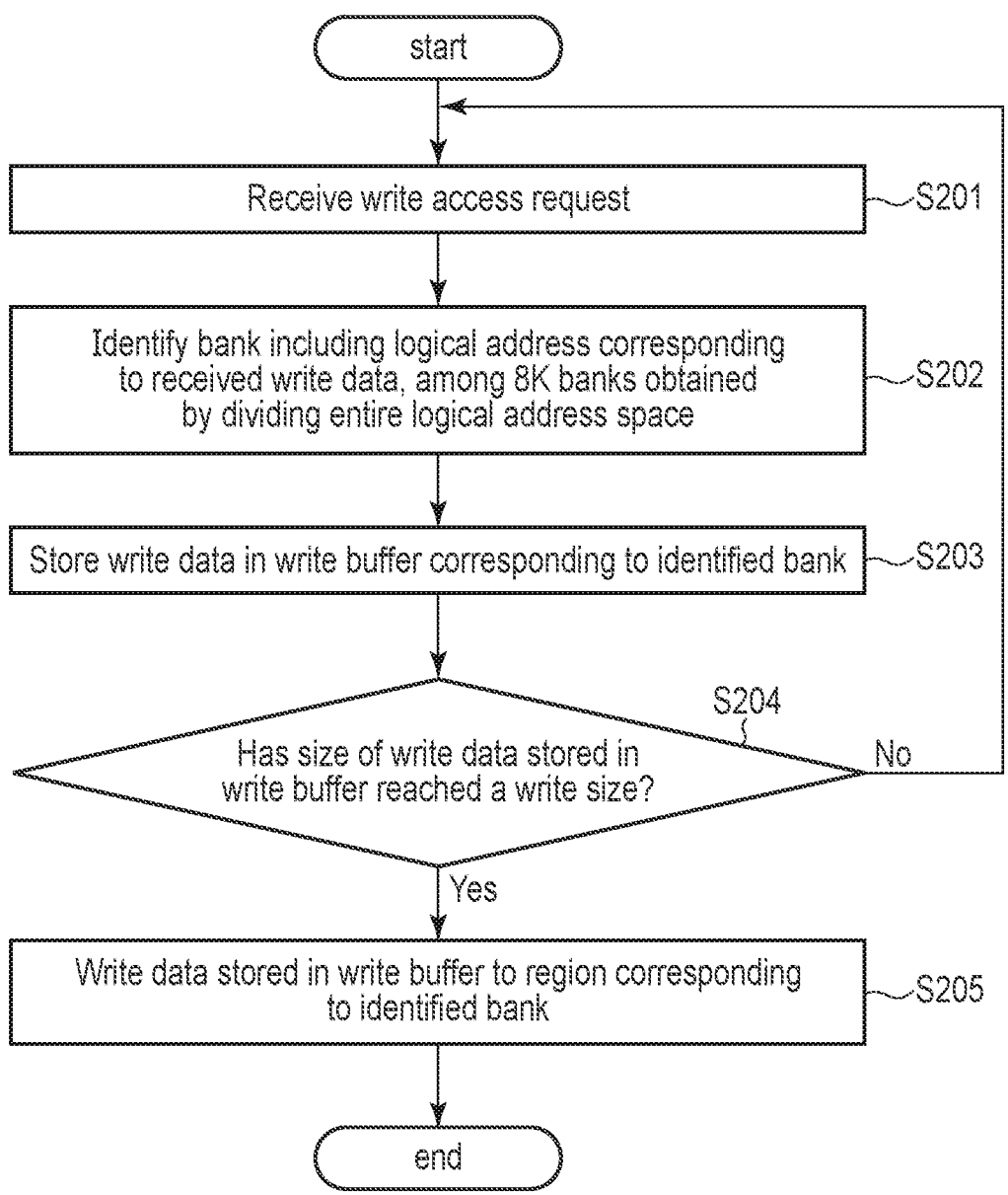
F I G. 16

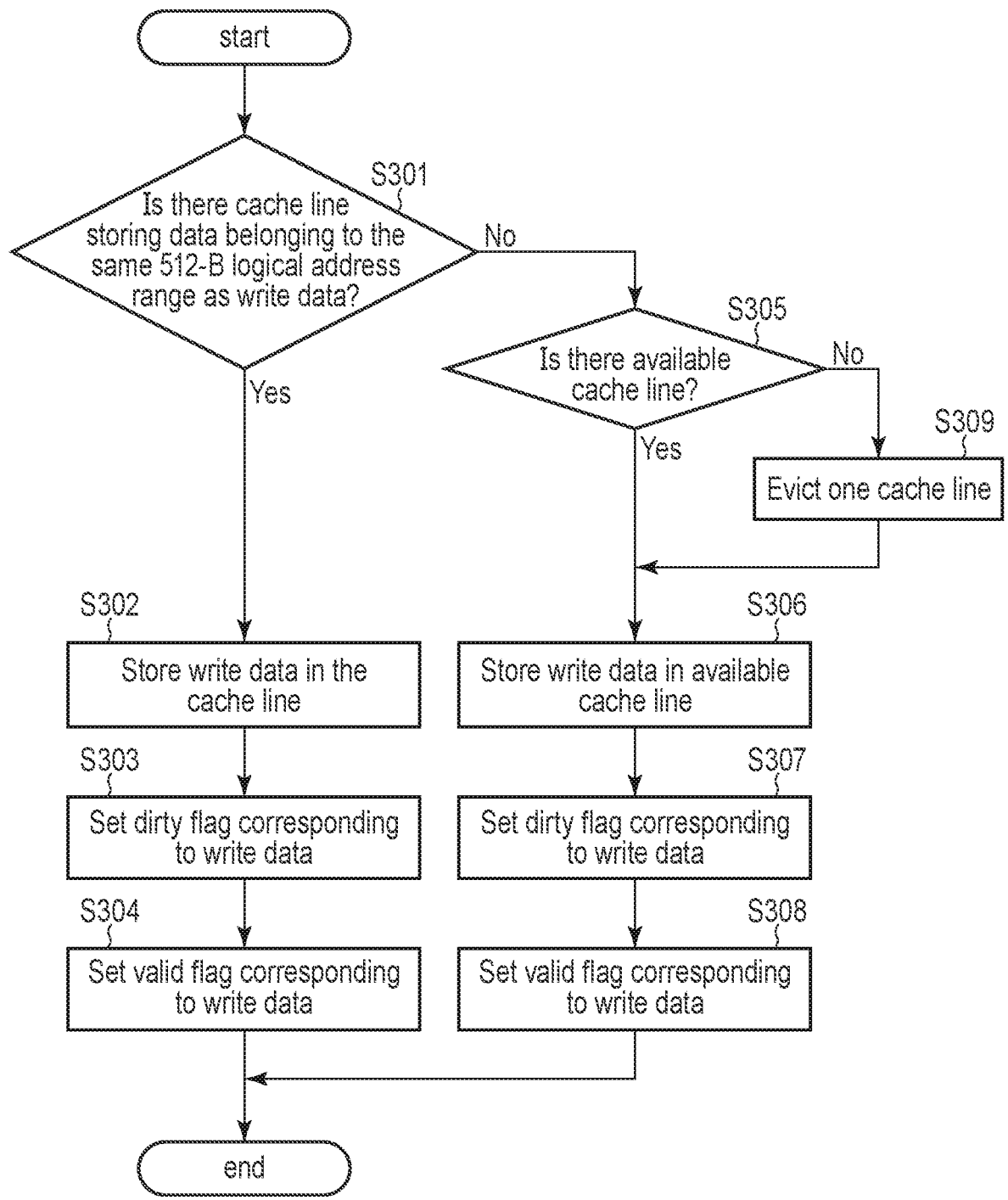
F I G. 17

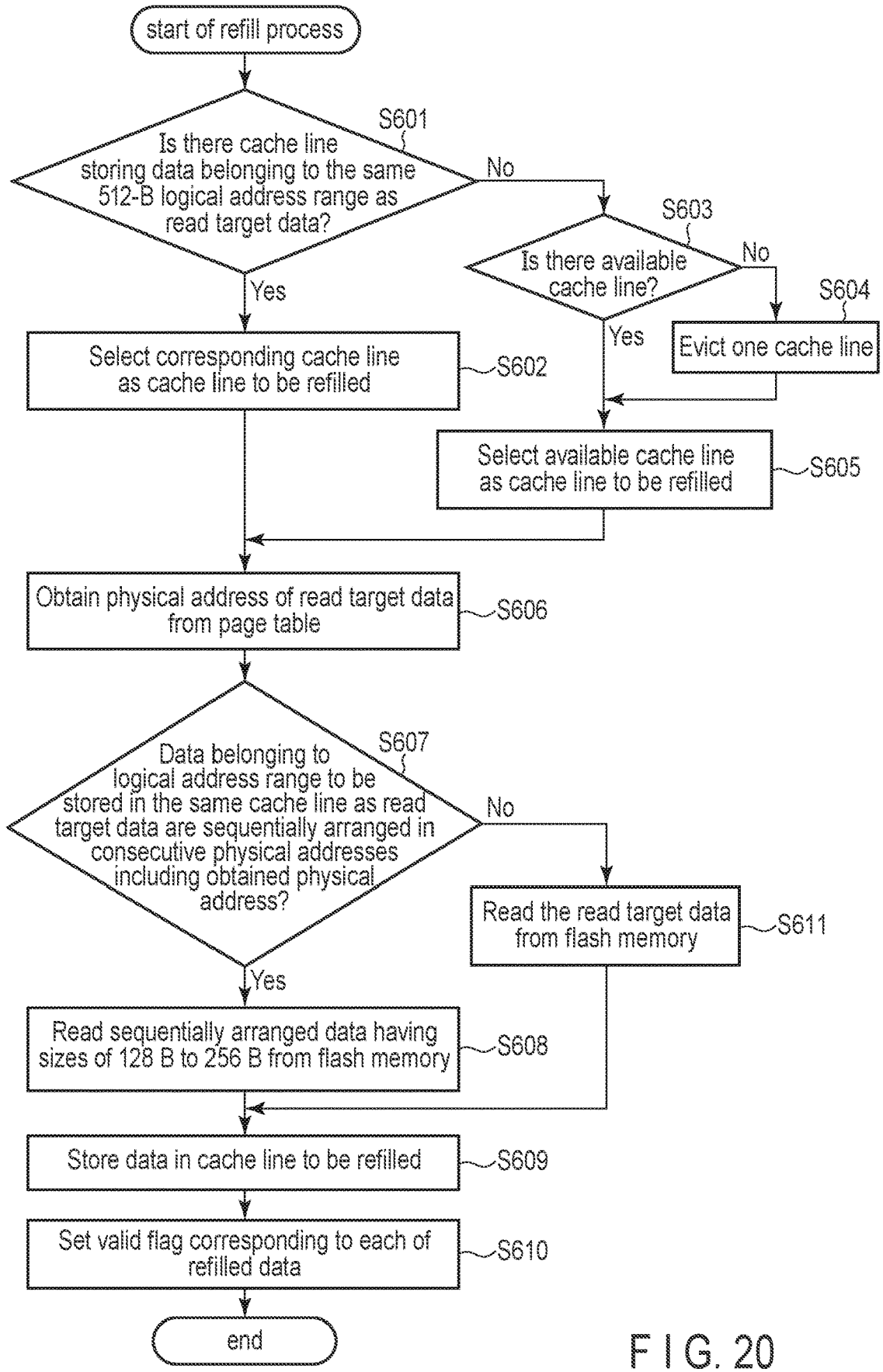
F I G. 20

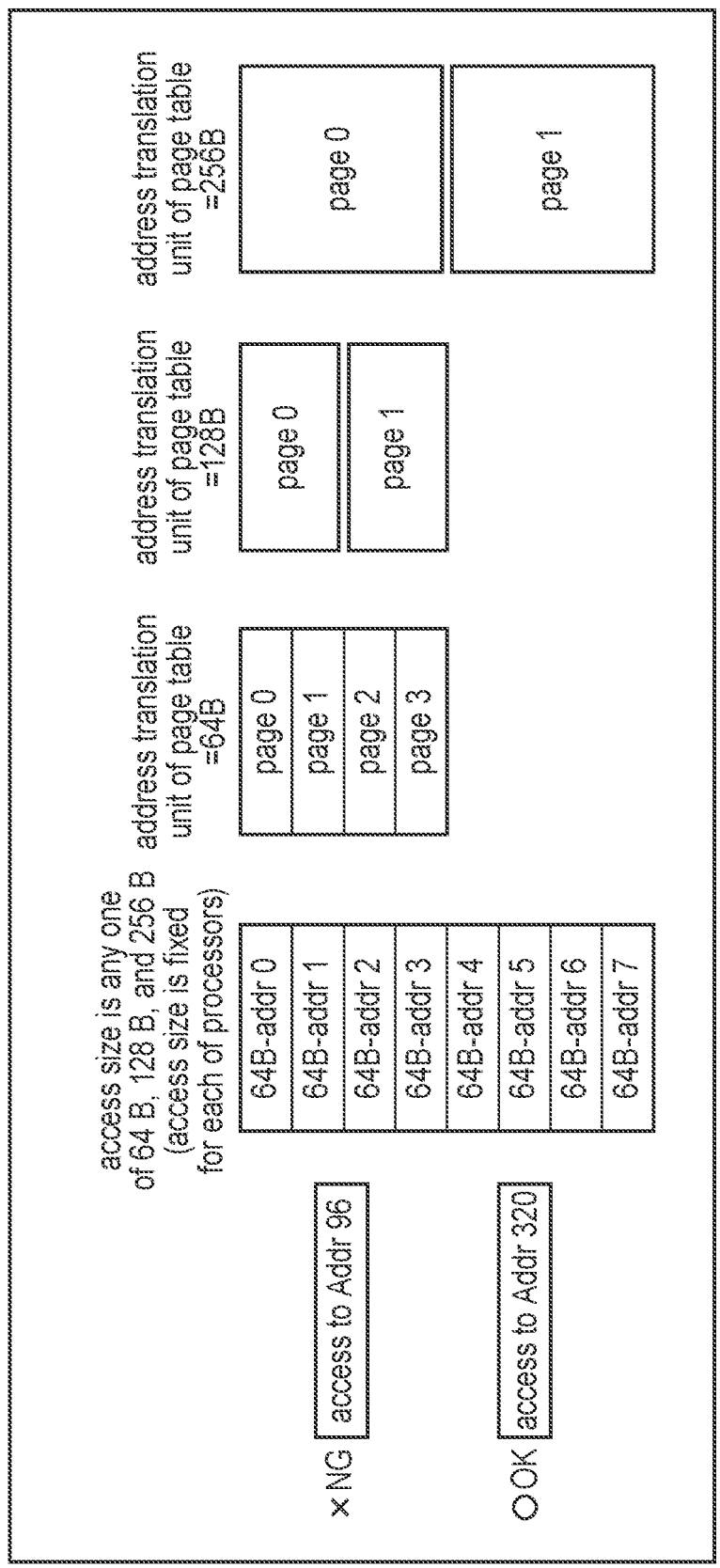
F I G. 21

MEMORY SYSTEM CONTROLLING NONVOLATILE MEMORY

CROSS-REFERENCE TO RELATED APPLICATIONS

This application is based upon and claims the benefit of priority from Japanese Patent Application No. 2021-177607, filed Oct. 29, 2021, the entire contents of which are incorporated herein by reference.

FIELD

Embodiments described herein relate generally to a technique that controls a nonvolatile memory.

BACKGROUND

In recent years, a memory system including a nonvolatile memory has been widely used. In the memory system, mapping between individual logical addresses and individual physical addresses of the nonvolatile memory is managed in units of a certain management size using an address translation table.

In the case in which a flash memory is controlled by a solid state drive (SSD) or the like, a management size of four kilo-bytes (4 KB) is often used. In the case in which the flash memory with a management size of 4 KB is applied to a memory system that allows 64-byte access (64 B), when rewriting only 64-B data, which is a part of the already written 4-KB data, it is necessary to execute a read modify write operation including an operation of reading the already written 4-KB data from the nonvolatile memory, an operation of modifying the read 4-KB data with 64-B data, and an operation of writing the modified 4-KB data to the nonvolatile memory. Such a read modify write operation becomes a factor of increasing the write amplification of the memory system.

In addition, when a method of reducing the address translation unit of the address translation table is simply applied in order to support a fine access granularity, the size of the address translation table increases.

Therefore, it is necessary to realize a new technology capable of supporting a fine access granularity while minimizing the amount of an increase in the size of the address translation table.

BRIEF DESCRIPTION OF THE DRAWINGS

FIG. 1 is a block diagram illustrating an example of a configuration of an information processing system including a memory system according to an embodiment.

FIG. 2 is a block diagram illustrating a relationship between a media control unit and a plurality of flash dies, which are provided in the memory system according to the embodiment.

FIG. 6 is a diagram illustrating a relationship between components provided in the memory system according to the embodiment and a plurality of banks.

FIG. 7 is a diagram illustrating a relationship between components provided in the memory system according to the embodiment, a plurality of banks, and a plurality of sub-regions.

FIG. 13 is a diagram illustrating a refill operation executed in the memory system according to the embodiment.

FIG. 14 is a diagram illustrating first location information having a 16-bit width applied to 64 byte data and second location information having a 32-bit width applied to 128 byte data, which are used in the memory system according to the embodiment.

FIG. 15 is a flowchart illustrating a procedure of a preparation process executed in the memory system according to the embodiment.

FIG. 16 is a flowchart illustrating a procedure of a process of writing data to a region through a write buffer, which is executed in the memory system according to the embodiment.

FIG. 17 is a flowchart illustrating a procedure of a write process executed in the memory system according to the embodiment.

FIG. 20 is a flowchart illustrating a procedure of a refill operation executed in the memory system according to the embodiment.

FIG. 21 is a diagram illustrating various management sizes used in the memory system according to the embodiment.

DETAILED DESCRIPTION

Figure 3:
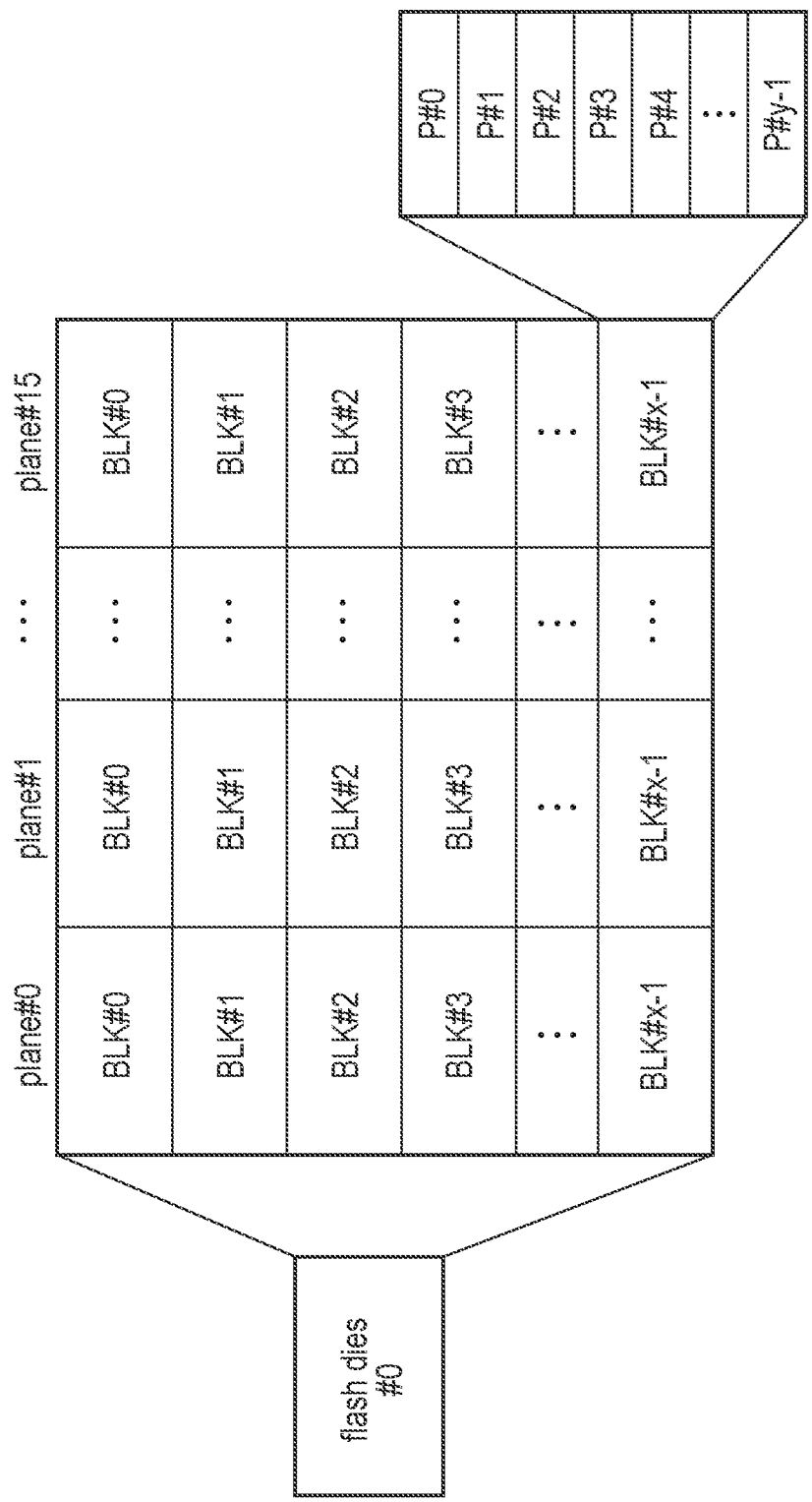
FIG. 3 is a block diagram illustrating an example of a configuration of a flash die in a NAND flash memory included in the memory system according to the embodiment.

Various embodiments will be described hereinafter with reference to the accompanying drawings.

In general, according to one embodiment, a memory system is connectable to a host through a memory bus. The memory system comprises a random access memory, a nonvolatile memory, and a controller. The controller manages $2^N$ banks that are $2^N$ small logical address spaces obtained by dividing a logical address space used by the host to access the memory system, and $2^N$ regions included in a physical storage area of the nonvolatile memory, the $2^N$ regions corresponding one-to-one to the $2^N$ banks, wherein N is a natural number. The controller stores an address translation table in the random access memory, the address translation table including a plurality of entries respectively corresponding to a plurality of logical addresses which are contiguous in units of a first size corresponding to granularity of data read/write-accessed by the host, the address translation table managing mapping between each of the plurality of logical addresses and each of a plurality of physical addresses of the physical storage area. The controller allocates $2^N$ write buffers to the random access memory, the $2^N$ write buffers corresponding one-to-one to the $2^N$ banks, each of the $2^N$ write buffers having at least a first capacity corresponding to a write size of the nonvolatile memory. In response to receiving a write access request and first write data from the host, the write access request specifying a logical address of the first write data, the controller identifies a bank to which the logical address of the first write data belongs, and writes the first write data to a write buffer corresponding to the identified bank among the $2^N$ write buffers. After a total size of write data stored in the write buffer, including the first write data, becomes equal to or larger than a threshold size, the controller writes the write data including the first write data to a first region among the $2^N$ regions, the first region corresponding to the identified bank. Each of the plurality of entries stores, as the physical address, location information indicating one of a plurality of first storage locations, the plurality of first storage locations being included in one region among the $2^N$ regions, the one region corresponding to one bank to which a logical address corresponding to the entry belongs. Each of the plurality of entries does not store location information for identifying the one region.

FIG. 1 is a block diagram illustrating an example of a configuration of an information processing system 1 including a memory system according to an embodiment. The information processing system 1 includes a host (host device) 2 and a memory system 3. The host 2 and the memory system 3 are connectable to each other through a memory bus 4. The memory bus 4 is, for example, a CXL™ bus conforming to the Compute Express Link™ (CXL™) standard, a bus conforming to the OpenCAPI (Open Coherent Accelerator Processor Interface) standard, or a PCIe® bus conforming to the PCI Express® (PCIe®) standard.

The host 2 is an information processing apparatus. The host 2 is, for example, a server computer or a personal computer. The host 2 accesses the memory system 3 through the memory bus 4. Specifically, the host 2 transmits a store command, which is a write access request that writes data, to the memory system 3 through the memory bus 4. In addition, the host 2 transmits a load command, which is a read access request that reads data, to the memory system 3 through the memory bus 4.

The memory system 3 is a memory device including a nonvolatile memory. The memory system 3 is connectable to the host 2 through the memory bus 4.

Next, the internal configuration of the host 2 will be described. The host 2 includes a processor 21 and a memory 22.

The processor 21 is a central processing unit (CPU). The processor 21 executes software (host software) loaded into the memory 22. The host software is loaded to the memory 22 from the memory system 3 or a storage device, not illustrated, connected to the host 2. The host software includes an operating system, a file system, a device driver, an application program, and the like. The processor 21 has a virtual memory function. The memory management unit of the processor 21 translates a virtual memory address used by the application program into a physical memory address. The processor 21 accesses the memory 22 using the physical memory address. The processor 21 also accesses the memory system 3 through the memory bus 4 using the physical memory address. The read/write access to the memory system 3 through the memory bus 4 is executed at a pre-defined granularity of data. The granularity of data is, for example, any of 64 bytes (64 B), 128 bytes (128 B), or 256 bytes (256 B). The granularity of data has a size corresponding to the bus width of the memory bus 4. In FIG. 1, the case in which the processor 21 executes read/write access to the memory system 3 at a granularity of 64 B is illustrated as an example. In the following, the granularity of data read/write-accessed by the host 2 through the memory bus 4 is referred to as "access granularity".

Next, the internal configuration of the memory system 3 will be described. The memory system 3 includes a controller 5, a NAND flash memory 6, and a dynamic random access memory (DRAM) 7.

The controller 5 is a memory controller. The controller 5 is a control circuit such as a System-on-a-Chip (SoC). The controller 5 controls the writing and reading of data to and from the NAND flash memory 6. In addition, the controller 5 controls the writing and reading of data to and from the DRAM 7. In addition, the controller 5 executes communication with the processor 21 of the host 2 through the memory bus 4. The controller 5 is configured capable of supporting a fine access granularity such as 64 B.

The NAND flash memory 6 is a nonvolatile memory. The NAND flash memory 6 is, for example, a flash memory having a three-dimensional structure. The memory cell array of the NAND flash memory 6 is divided into a plurality of planes. The NAND flash memory 6 includes a plurality of blocks for each plane. The individual blocks are a unit of a data erase operation. Each of the blocks includes a plurality of physical pages. The individual physical pages include a plurality of memory cells connected to the same word line. The individual physical pages are a unit of a data program operation and a data read operation. In a data read operation within the page, the NAND flash memory 6 can output only a part of data of one physical page size which are read from one physical page, to the controller 5.

The DRAM 7 is a random access memory. The DRAM 7 is a volatile memory that allows high speed access higher than the NAND flash memory 6 does.

Next, functions executed by the controller 5 will be described. The controller 5 executes the management of data stored in the NAND flash memory 6 and the management of blocks included in the NAND flash memory 6.

The management of data includes the management of mapping information indicating a correspondence relationship between each of the logical addresses and each of the physical addresses of the NAND flash memory 6. With the use of the address translation table, the controller 5 manages mapping between each of the logical addresses and each of the physical addresses in units of a certain management size. The address translation table is also referred to as a logical-to-physical address translation table (L2P table) or a page table. The logical address is an address used by the host 2 (processor 21) to access the memory system 3. The physical address is an address indicating a storage location (physical storage location) included in a physical storage area included in the NAND flash memory 6. In the present embodiment, a physical memory address output from the processor 21 to the memory bus 7 is used as a logical address that accesses the memory system 3. That is, the address translation table translates the physical memory address output from the processor 21 into the physical address of the NAND flash memory 6.

In the NAND flash memory 6, data can be written to the physical page of the block only once per program/erase cycle of the block. That is, new data is not allowed to be directly overwritten on the physical storage area in the block in which data has already been written. Therefore, in the case in which data already written in the physical storage area is updated, the controller 5 writes new data in an unwritten area in the block (or another block), and handles the previous data as invalid data. In other words, the controller 5 writes update data corresponding to a certain logical address not to a storage location where previous data corresponding to this logical address is stored but to another storage location. The controller 5 then updates the address translation table, and associates a physical address indicating another storage location with the logical address.

The management of blocks included in the NAND flash memory 6 includes the management of defective blocks (bad blocks), wear leveling, and garbage collection (GC).

GC is an operation of increasing the number of free blocks. The free block means a block that does not include valid data. In the GC operation, the controller 5 selects some blocks in which valid data and invalid data are mixed as GC source blocks. The GC source block is also referred to as a copy source block or a movement source block. The controller 5 copies valid data included in the GC source block to a GC destination block (e.g., the free block). The GC destination block is also referred to as a copy destination block or a movement destination block. Here, the valid data means data associated with the logical address. The data associated with the logical address as the latest data is valid data, and may be read by the host 2 later. That is, data that is referenced from the current page table is valid data. The invalid data means data that is not associated with any logical address. The data that is not associated with any logical address is data that is no longer likely to be read by the host 2. That is, data that is no longer referenced from the current page table is invalid data. When the valid data is copied from the GC source block to the GC destination block, the controller 5 updates the address translation table and maps the physical address of the copy destination to the logical addresses of the copied valid data. A block that become a block including only invalid data by copying valid data to another block is released as a free block. As a result, this block can be reused for writing data after the data erase operation is performed on this block.

Next, the internal configuration of the controller 5 will be described. The controller 5 includes a cache 51 and a media control unit 52.

The cache 51 is hardware that stores data having a high access frequency. The data storage area of the cache 51 is realized using the DRAM 7. The cache control logic that controls the cache 51 is implemented in the controller 5.

The media control unit 52 is a circuit that controls the NAND flash memory 6.

Next, an example of a configuration of the NAND flash memory 6 will be described. FIG. 2 is a block diagram illustrating a relationship between the medium control unit 52 and a plurality of flash dies provided in the memory system 3 according to the embodiment.

The NAND flash memory 6 includes, for example, 32 NAND flash memory dies (flash dies #0 to #31). The flash dies #0 to #31 can operate independently of each other. The flash dies #0 to #31 are connected to 32 channels ch.0 to ch.31, respectively. The medium control unit 52 can access the flash dies #0 to #31 in parallel through the channels ch.0 to ch.31. Therefore, the medium control unit 52 can simultaneously write data in up to 32 flash dies (the number of parallel writes=32). Note that a configuration may be used in which two or more flash dies are connected to each of the channels ch.0 to ch.31.

Next, an example of a configuration of the flash die will be described. FIG. 3 is a block diagram illustrating an example of a configuration of a flash die in the NAND flash memory 6 included in the memory system 3 according to the embodiment.

The flash die #0 has a multi-plane configuration including a plurality of planes. For example, the memory cell array of the flash die #0 is divided into 16 planes (planes #0 to #15). The planes #0 to #15 each include a plurality of blocks BLK #0 to BLK #x−1. The blocks BLK #0 to BLK #x−1 each include a plurality of physical pages (P #0 to P #y−1). The size (physical page size) of the individual physical pages P #0 to P #y−1 is, for example, 4 KB. The flash die #0 is operable in a multiplane mode in which data is simultaneously written to eight planes. Therefore, writing of data to the flash die #0 can be executed in units of 32 KB (=4 KB×8 planes). The other flash dies #1 to #31 also have the same configuration as that of the flash die #0.

Figure 4:
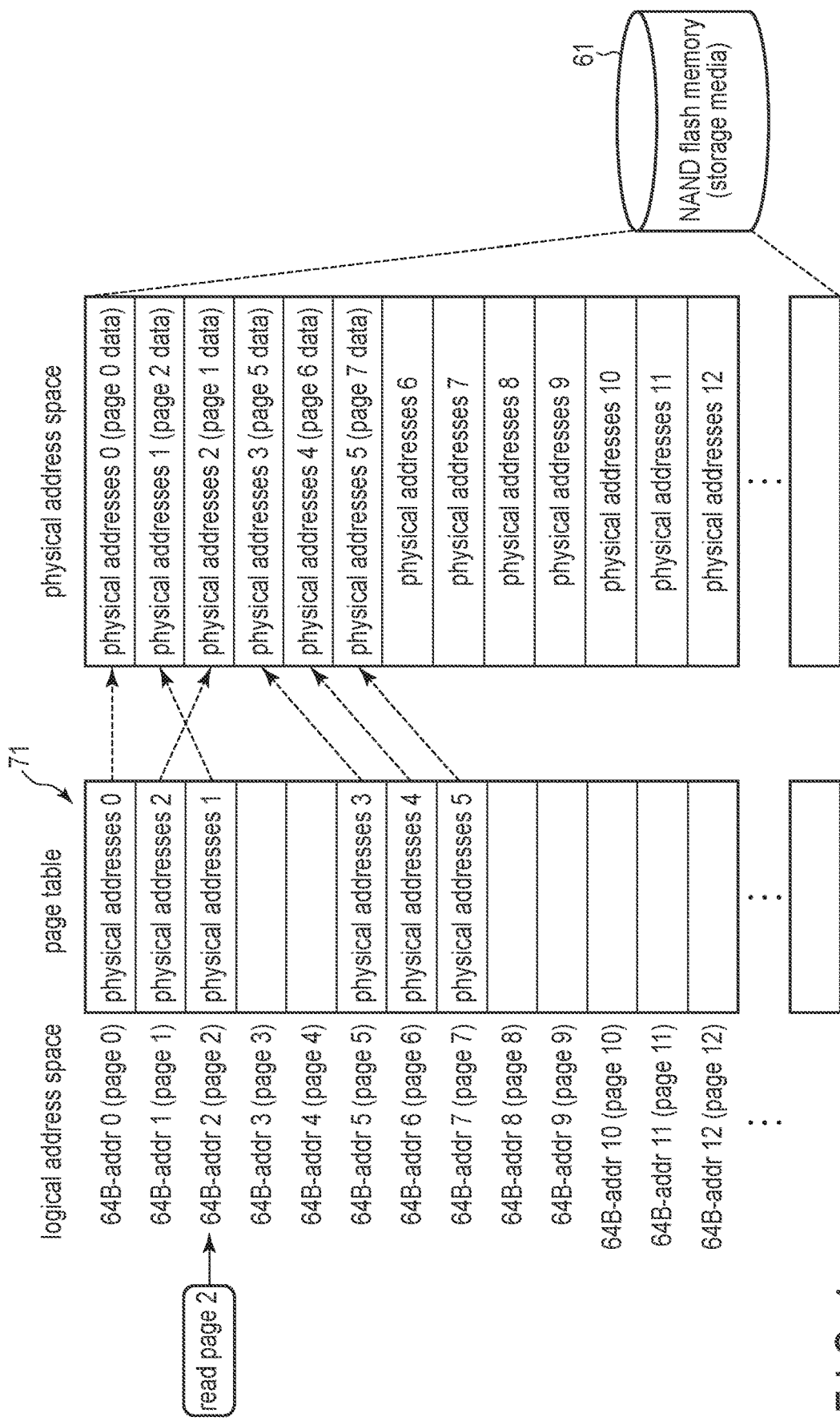
FIG. 4 is a diagram illustrating a correspondence relationship between each of logical addresses and each of physical addresses, which is managed by an address translation table used in the memory system according to the embodiment.

Next, the address translation table will be described. FIG. 4 is a diagram illustrating a correspondence relationship between each of the logical addresses and each of the physical addresses managed by the address translation table used in the memory system 3 according to the embodiment.

A page table 71 is an address translation table (L2P table) that manages mapping between each of the logical addresses included in the logical address space and each of the physical addresses included in the physical address space. The logical address space is a memory address space used by the host 2 to access the memory system 3. The physical address space is an address space indicating a plurality of storage locations (physical storage locations) on the physical storage area of the NAND flash memory 6.

In the present embodiment, the page table 71 manages mapping between each of the logical addresses included in the logical address space and each of the physical addresses included in the physical address space in units of a first size corresponding to granularity (access granularity) of data read/write-accessed by the host. In the following, the case in which the access granularity is 64 bytes (64 B) and the page table 71 manages mapping between each of the logical addresses and each of the physical addresses in units of 64 B will be mainly described. In the case in which the page table 71 manages mapping between each of the logical addresses and each of the physical addresses in units of 64 B, the address translation unit of the page table 71 is 64 B. The address translation unit of the page table 71 is also referred to as a page.

The page table 71 includes a plurality of entries corresponding to a plurality of logical addresses which are contiguous in units of 64 B, such as a logical address "0", a logical address "64", and a logical address "128". In general, although a configuration in which only a part of the address translation table is stored in the DRAM 7 as a cache is often used, in the present embodiment, all entries included in the page table 71 are stored in the DRAM 7 in order to enable making reference to and updating the page table 71 with low latency. Note that a configuration in which most entries (e.g., 80% or more of entries) of the page table 71 are stored in the DRAM 7 may be used.

In FIG. 4, "64 B-addr 0" to "64 B-addr 12" indicate logical addresses which are contiguous in units of 64 B.

Each of the entries of the page table 71 stores a physical address in which data of a corresponding logical address is stored. The physical address is location information indicating a storage location in a physical storage area of the NAND flash memory 6.

FIG. 4 illustrates the case in which 64-B data (data of page 0) corresponding to the logical address "64 B-addr 0" is stored in a storage location in the physical storage area indicated by the physical address 0, 64-B data (data of page 1) corresponding to the logical address "64 B-addr 1" is stored in a storage location in the physical storage area indicated by the physical address 2, 64-B data (data of page 2) corresponding to the logical address "64 B-addr 2" is stored in a storage location in the physical storage area indicated by the physical address 1, and 64-B data (data of page 5) corresponding to the logical address "64 B-addr 5" is stored in a storage location in the physical storage area indicated by the physical address 3, 64-B data (data of page 6) corresponding to a logical address "64 B-addr 6" is stored in a storage location in a physical storage area indicated by a physical address 4, and 64-B data (data of page 7) corresponding to a logical address "64 B-addr 7" is stored in a storage location in a physical storage area indicated by a physical address 5.

In this case, the entry corresponding to the logical address "64 B-addr 0" stores the physical address 0, the entry corresponding to the logical address "64 B-addr 1" stores the physical address 2, and the entry corresponding to the logical address "64 B-addr 2" stores the physical address 1. In addition, the entry corresponding to the logical address "64 B-addr 5" stores the physical address 3, the entry corresponding to the logical address "64 B-addr 6" stores the physical address 4, and the entry of the page table 71 corresponding to "64 B-addr 7" stores the physical address 5.

In this state, when a read access request that reads data corresponding to the logical address "64 B-addr 2" (page 2) is received from the host 2 through the memory bus 4, the physical address 1 is obtained from the entry corresponding to the logical address "64 B-addr 2" (page 2). The 64-B data stored in the obtained physical address 1 is then read from the NAND flash memory 6. The read 64-B data is transmitted to the host 2 through the memory bus 4.

In general, the address translation table often manages mapping between each of the logical addresses and each of the physical addresses in units of 4 KB. In this case, when rewriting only 64-B data that is a part of the already written 4-KB data, it is necessary to execute a read modify write operation including an operation of reading the already written 4-KB data from the NAND flash memory 6, an operation of modifying the read 4-KB data with 64-B data, and an operation of writing the modified 4-KB data to another storage area of the NAND flash memory 6. Since 4-KB data is written to the NAND flash memory 6 while the size of data specified by the write access request from the host 2 is 64 B, the amount of write to the NAND flash memory 6 is 64 times the amount of host write, i.e., the write amplification is 64 (=4 K/64).

In the present embodiment, the page table 71 manages mapping between each of the logical addresses and each of the physical addresses in units of 64 B. Therefore, even in the case in which a write access request that requests writing of 64-B data is received from the host 2 in any order of logical addresses, it is possible to sequentially write individual pieces of 64-B data to the physical storage area of the NAND flash memory 6. In addition, it is possible to manage the location information (physical address) indicating the storage location on the physical storage area where each piece of 64-B data is written using the page table 71. Therefore, when rewriting the already written 64-B data, only the updated 64-B data is written to another storage location in the physical storage area of the NAND flash memory 6. The page table 71 is then updated, and a physical address indicating the other storage location in the physical storage area in which the updated 64-B data is written is associated with the logical address corresponding to this 64-B data. Therefore, even in the case in which the 64-B random write access is executed by the host 2, it is possible to maintain the write amplification at a small value.

In the case of managing the mapping in units of 64 B, the number of necessary page table entries is 64 times the number of page table entries necessary to manage the mapping in units of 4 KB. In addition, the bit width of the physical address per page table entry also increases. This is because it is necessary that the physical address stored in each page table entry indicate the storage location in units finer than the unit of 4 KB.

Therefore, the present embodiment provides the controller 5 having a new configuration capable of managing mapping between each of the logical addresses and each of the physical addresses at a fine access granularity such as 64 B while minimizing an increase in the size of the page table 71. Specifically, in the controller 5, (1) a bank configuration that reduces the size of the page table 71 and (2) a write buffer prepared for each bank are used. In addition, in the present embodiment, in order to realize low latency, (3) a cache capable of collecting a plurality of pieces of 64-B write data associated with a plurality of 64-B random write accesses issued by the host 2 at different times, into data having sizes of 128 B to 512 B corresponding to a plurality of contiguous logical addresses is realized.

Here, the outline of the bank configuration will be described. The controller 5 divides the logical address space into $2^N$ banks. The $2^N$ banks are $2^N$ small logical address spaces obtained by dividing the logical address space. N is a natural number. The controller 5 manages (i) $2^N$ banks and (ii) $2^N$ regions that correspond one-to-one to the $2^N$ banks and are included in the physical storage area of the NAND flash memory 6. The $2^N$ regions are $2^N$ small physical storage areas included in the physical storage area. The physical storage area of the NAND flash memory 6 may include a larger number of regions than $2^N$ regions. $2^N$ regions of all the regions included in the physical storage area are associated with $2^N$ banks on one-to-one. For example, in the case in which the capacity allocated to the $2^N$ banks is 512 GB in the physical storage area of the NAND flash memory 6, each of the $2^N$ regions has a capacity of $512 \text{ GB}/2^N$.

The controller 5 then writes data corresponding to a logical address belonging to a certain bank among the $2^N$ banks, to a region corresponding to this bank. As a result, in the page table 71, the entry corresponding to a certain logical address needs only store location information indicating any one of a plurality of storage locations included in one region corresponding to the bank to which this logical address belongs, and it is not necessary to store location information that identifies this one region. That is, the storage location where the data corresponding to a certain logical address is written is represented by (i) the region corresponding to the bank to which this logical address belongs and (ii) the location information stored in the entry of the page table 71 corresponding to this logical address. As a result, it is possible to reduce the bit width of the physical address that has to be stored per entry of the page table 71 by N bits as compared with a normal configuration in which the logical address space is not divided. For example, N can be set to a natural number of ten or more. In the case in which N is ten or more, it is possible to reduce the number of bits of the physical address that has to be stored per entry of the page table 71 by 10 bits or more.

Further, the controller 5 can also divide each region into $2^M$ sub-regions. M is a natural number. The controller 5 determines, as a read/write target sub-region, one sub-region among the $2^M$ sub-regions included in the region corresponding to the bank to which the logical address specified by the read/write access request received from the host 2 belongs. The one sub-region is determined from the logical address specified by the read/write access request. For example, consider the case in which M=1. In this case, two sub-regions are included in the region corresponding to the bank to which the logical address specified by the read/write access request belongs. In the two sub-regions, one sub-region determined from a specific 1-bit value of the logical address is determined as a read/write target sub-region. In addition, in the case in which M=4, 16 sub-regions are included in the region corresponding to the bank to which the logical address specified by the read/write access request belongs. Among the 16 sub-regions, one sub-region determined from a value of a specific 4-bits of the logical address is determined as a read/write target sub-region. In order to determine the sub-region, a specific bit of a value obtained by translating the logical address by a hash function may be used.

The individual entries of the page table 71 need only store location information indicating any one of the storage locations included in one sub-region. The number of the storage locations included in one sub-region is smaller than the number of storage locations included in one region. Therefore, as compared with a configuration in which the region is not divided, it is possible to further reduce the number of bits of the physical address that has to be stored per entry of the page table 71 by M bits.

Next, the outline of the write buffer prepared for each bank will be described. The writing of data to the NAND flash memory 6 is executed in units of the write size of the NAND flash memory 6. For example, in the case in which the physical page size of the NAND flash memory 6 is 4 KB and simultaneous writing to eight planes is performed, the write size is 32 KB (=4 KB×8 planes). In the present embodiment, basically, pieces of write data from the host 2 respectively corresponding to logical addresses belonging to a certain bank are written to a region corresponding to this bank in units of 32 KB. Therefore, the controller 5 waits until write data of about 32 KB for the same bank are accumulated, and after the write data of about 32 KB for the same bank are accumulated, writing to the region corresponding to this bank is started. In addition, in order to capably support 64-B random write accesses across $2^N$ banks, it is necessary to separately store write data from the host 2 for each of the $2^N$ banks. Therefore, in the present embodiment, $2^N$ write buffers corresponding one-to-one to $2^N$ banks are allocated to the DRAM 7.

Here, the write process executed using $2^N$ write buffers will be described. In response to receiving the write access request and the 64-B write data from the host 2 through the memory bus 4, the controller 5 identifies a bank to which the logical address of the 64-B write data specified by the received write access request belongs. The controller 5 writes the 64-B write data to the write buffer corresponding to the identified bank. In this manner, a plurality of pieces of write data corresponding to the logical addresses belonging to a certain bank are accumulated in the write buffer corresponding to this bank. When the total size of the write data stored in the write buffer reaches the write size (here, 32 KB), the controller 5 writes the write data having a size of 32 KB stored in the write buffer to the region corresponding to the bank. Note that even in the case in which the total size of the write data stored in the write buffer does not reach 32 KB, a configuration that can start writing to the region may be applied as necessary. In this case, a configuration in which padding is added to the write data stored in the write buffer may be used. In other words, the writing to the region may be executed after the total size of the write data stored in the write buffer becomes equal to or larger than a certain size (i.e., threshold size).

In this manner, by allocating $2^N$ write buffers corresponding to $2^N$ banks to the DRAM 7 on one-to-one, it is possible to support random write access across $2^N$ banks.

Next, the outline of the cache will be described. The cache 51 includes a plurality of cache lines. Since the access granularity is 64 B, usually, the cache line size may be 64 B. In the present embodiment, the cache line size is set to a size larger than 64 B, for example, 512 B. The controller 5 stores a plurality of 64-B write data corresponding to a plurality of consecutive logical addresses in any one of the cache lines. For example, consider the case in which 64-B write data having a logical address belonging to a certain 512-B logical address range is received and another 64-B write data belonging to the same 512-B logical address range as the logical address of the received 64-B write data is already stored in a certain cache line. In this case, the controller 5 stores the received 64-B write data in this cache line. As a result, it is possible to collect a plurality of pieces of 64-B write data associated with a plurality of 64-B random write accesses issued by the host 2 at different times, into one piece of write data having sizes of 128 B to 512 B corresponding to contiguous logical addresses. For example, when four pieces of 64-B write data corresponding to four contiguous logical addresses are stored on the same cache line, the four pieces of 64-B write data are combined into one write data having a size of 256 B on the cache line.

In the case in which a certain cache line is selected as a cache line for write-back or eviction, the controller 5 executes a write back operation. The write-back operation is a process of writing dirty data from the cache 51 to the NAND flash memory 6 through the write buffer. The dirty data is write data that has not yet been reflected in the NAND flash memory 6.

Here, the case in which a cache line in which four pieces of 64-B write data corresponding to four contiguous logical addresses are stored is selected as a cache line for write-back or eviction is considered. In this case, the controller 5 executes a write-back operation for four pieces of 64-B write data (i.e., write data having a size of 256 B). Specifically, the controller 5 writes the four pieces of 64-B write data to one region of the $2^N$ regions through one write buffer of the $2^N$ write buffers such that the four pieces of 64-B write data corresponding to the four contiguous logical addresses are sequentially arranged in a plurality of storage locations which are included in the one region of the $2^N$ regions and are physically contiguous. This region is a region corresponding to one bank to which the four logical addresses of the four pieces of 64-B write data belong together. As a result, it is possible to sequentially arrange four pieces of 64-B write data associated with four 64-B random write accesses issued by the host 2 at different times, in a plurality of storage locations which are included in one region and are physically contiguous.

When the write-back operation for the data stored in the cache line for eviction is completed, the cache line is initialized.

On the other hand, in the case in which the write-back operation for the data stored in the cache line for write-back is completed, the data stored in the cache line for write-back is maintained as valid data in the cache line. Specifically, after the write-back operation is completed, a dirty flag corresponding to each piece of data that has been written back is reset, but each piece of data that has been written back is kept maintained in the cache line as valid data.

Next, the case in which a cache line storing eight pieces of 64-B write data corresponding to eight contiguous logical addresses is selected as a cache line for eviction is considered. In this case, the controller 5 executes a write-back operation for eight pieces of 64-B write data (i.e., write data having a size of 512 B). Specifically, the controller 5 writes the eight pieces of 64-B write data to one region of the $2^N$ regions through one write buffer of the $2^N$ write buffers such that the eight pieces of 64-B write data corresponding to the contiguous eight logical addresses are sequentially arranged in a plurality of storage locations which are physically contiguous and are included in the one region of the $2^N$ regions. This region is a region corresponding to one bank to which the eight logical addresses of the eight pieces of 64-B write data belong together. As a result, it is possible to sequentially arrange the eight pieces of 64-B write data associated with the eight 64-B random write accesses issued by the host 2 at different times, in a plurality of storage locations in one region which are physically contiguous.

Next, consider the case in which a cache line in which only one piece of 64-B write data is stored is selected as a cache line for write-back or eviction. In this case, the controller 5 writes the 64-B write data to one region of the $2^N$ regions through one write buffer of the $2^N$ write buffers. This region is a region corresponding to a bank to which the logical address of the 64-B write data belongs.

In this manner, the write-back operation of write data of a plurality of sizes from 64 B to 512 B is executed.

Next, the outline of the refill operation of the cache 51 will be described. The refill operation is executed when the 64-B read target data specified by the read access request received from the host 2 does not exist in the cache 51. The refill operation is an operation of reading the 64-B read target data from the NAND flash memory 6 and storing the data in the cache 51. The refill operation can also support data of a plurality of sizes from 64 B to 512 B. That is, the controller 5 determines whether a plurality of pieces of 64-B data corresponding to a plurality of contiguous logical addresses and including the 64-B read target data are sequentially disposed at a plurality of storage locations in a region, which are physically contiguous. This region is a region corresponding to the bank to which the logical address of the 64-B read target data belongs.

For example, in the case in which four pieces of 64-B data corresponding to four consecutive logical addresses and including the 64-B read target data are sequentially disposed in a plurality of storage locations which are physically contiguous, the controller 5 reads the four pieces of 64-B data from the NAND flash memory 6 and stores the read data in one cache line of the cache 51. As a result, the 256-B data can be refilled by one read access to the NAND flash memory 6.

In addition, for example, in the case in which eight pieces of 64-B data corresponding to eight contiguous logical addresses and including the 64-B read target data are sequentially arrange in a plurality of storage locations which are physically contiguous, the controller 5 reads the eight pieces of 64-B data from the NAND flash memory 6 and stores the read data in one cache line of the cache 51. As a result, the 512-B data can be refilled by one read access to the NAND flash memory 6.

In the case in which the pieces of 64-B data corresponding to the contiguous logical addresses and including the 64-B read target data are not sequentially arranged in the storage locations which are physically contiguous, the controller 5 reads only the 64-B read target data from the NAND flash memory 6 and stores the read target data in one cache line of the cache 51.

In this manner, the refill operation for data of a plurality of sizes from 64 B to 512 B is executed.

Figure 5:
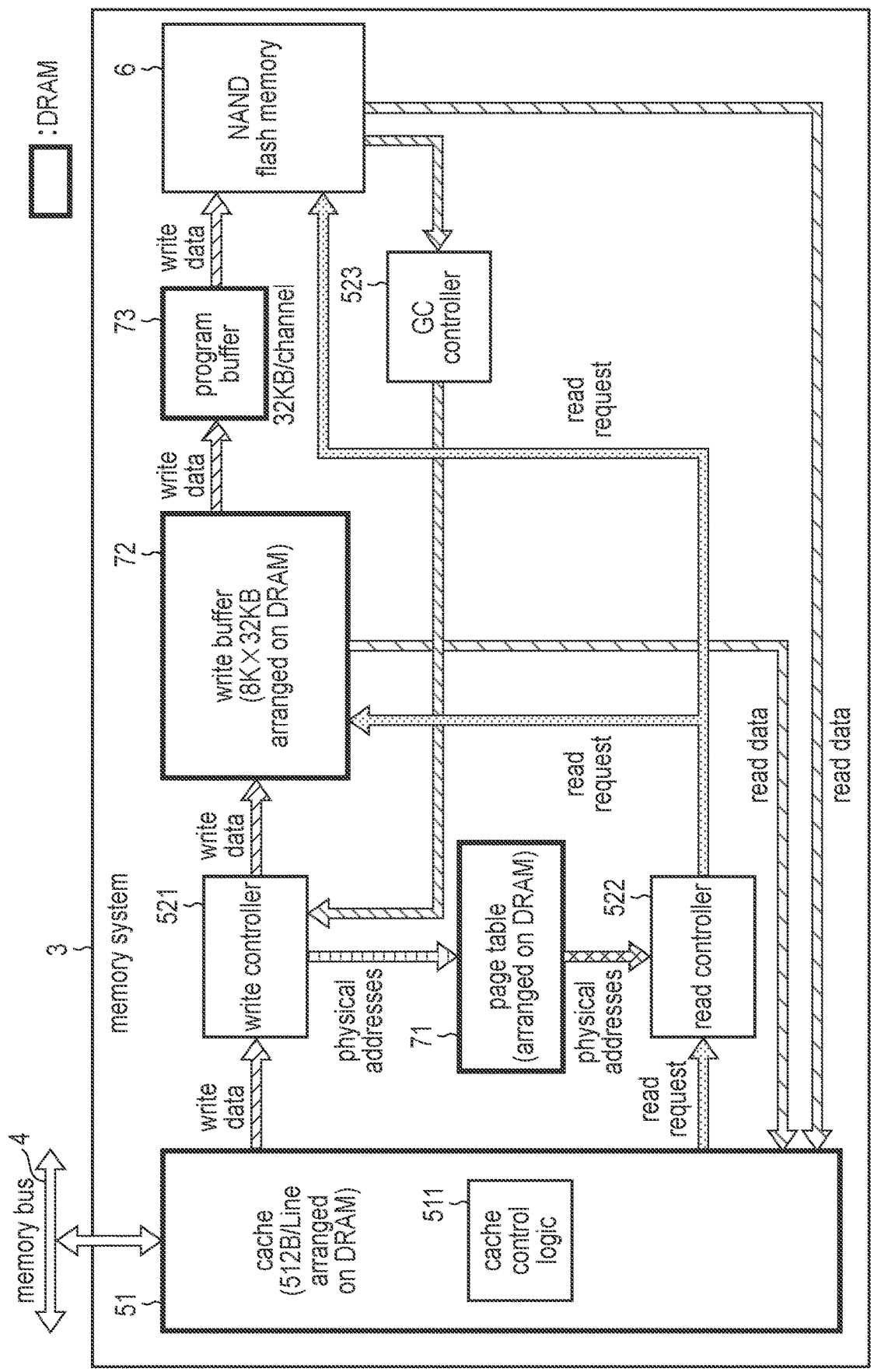
FIG. 5 is a diagram illustrating components provided in the memory system according to the embodiment, and a write-back operation, a refill operation, and a garbage collection operation executed in the memory system.

Next, components provided in the memory system 3, the write-back operation, the refill operation, and the garbage collection operation will be described. FIG. 5 is a diagram illustrating components provided in the memory system 3 according to the embodiment, and the write-back operation, the refill operation, and the garbage collection operation executed in the memory system 3.

In FIG. 5, a cache control logic 511 is a component of the cache 51. The cache control logic 511 is a circuit that controls the cache 51. The data memory area of the cache 51 is arranged in the DRAM 7, and the cache control logic 511 is implemented in the controller 5.

A write controller 521, a read controller 522, and a GC controller 523 are components of the medium control unit 52. The write controller 521 is hardware that executes the write-back operation. The read controller 522 is hardware that executes the refill operation. The GC controller 523 is hardware that executes the GC operation.

The page table 71, the write buffer 72, and the program buffer 73 are arranged in the DRAM 7. The write buffer 72 is a set of $2^N$ write buffers corresponding to $2^N$ banks. Each of the $2^N$ write buffers includes at least a capacity of a write size (32 KB). In the case in which N=13, the number of banks is 8K (=$2^{13}$). Therefore, since the write buffer 72 includes 8K write buffers, the capacity of the entire write buffer 72 is represented by 8K×32 KB. The program buffer 73 is, for example, a set of 32 program buffers corresponding to 32 channels. Each of the 32 program buffers is used to accumulate data to be written to a flash die connected to a corresponding channel by a write size (32 KB). The capacity of each of the 32 program buffers, i.e., the capacity of the program buffer 73 per channel is 32 KB.

Next, the operation of the cache control logic 511 will be described. In the case in which a write access request and 64-B write data are received from the host 2 through the memory bus 4, the cache control logic 511 stores the received 64-B write data in one of the cache lines of the cache 51. The size of the individual cache lines is 512 B. In the case in which there is a cache line in which 64-B write data having a logical address belonging to the same 512-B logical address range as the logical address of the received 64-B write data is already stored, the cache control logic 511 stores the received 64-B write data in this cache line. In the case in which there is no cache line in which the 64-B write data having the logical address belonging to the same 512-B logical address range as the logical address of the received 64-B write data is already stored, the cache control logic 511 stores the received 64-B write data in the available cache line (free cache line). In the case in which there is no available cache line, the cache control logic 511 selects one cache line as a cache line for eviction. In the case in which the dirty data exists in the selected cache line to be evicted, the write-back operation is executed by the write controller 521.

In the case in which a read access request is received from the host 2 through the memory bus 4, the cache control logic 511 executes a cache hit determination process. The cache hit determination process is a process of determining whether the read target data is stored in the cache 51. The read target data is 64-B data having a logical address specified by the read access request.

In the case in which the read target data exists in the cache 51, the cache control logic 511 reads the read target data from the cache 51. The cache control logic 511 then transmits the read target data, which has been read, to the host 2 through the memory bus 4.

In the case in which the read target data does not exist in the cache 51, the cache control logic 511 transmits a read request that requests reading of the read target data, to the read controller 522. When this read request is received, the read controller 522 executes the refill operation.

Next, the write-back operation executed by the write controller 521 will be described. Here, it is assumed that 64-B write data is written to the write destination region among the 8K regions included in the physical storage area of the NAND flash memory. The write destination region is a region corresponding to a bank to which the logical address of the 64-B write data belongs. In the write-back operation, the 64-B write data stored in the cache line to be evicted is written to the write destination region of the NAND flash memory 6 through one of the 8K 32-KB write buffers included in the write buffer 72 and one of the 32 32-KB program buffers included in the program buffer 73.

In the write-back operation, among the 8K banks, the bank to which the logical address of the write data belongs is identified by the write controller 521. The 64-B write data is then written to the 32-KB write buffer corresponding to the identified bank. After write data of a certain size or more is accumulated in the 32-KB write buffer, for example, when the total size of a plurality of pieces of write data which include this 64-B write data and are accumulated in the 32-KB write buffer reaches 32 KB (write size), the plurality of pieces of write data including this 64-B write data are written to one 32-KB program buffer. In the case in which the NAND flash memory 6 includes a plurality of flash dies, each of the 8K regions can be included in any one of the flash dies. For example, in the case in which the write destination region is included in the flash die #0 connected to the channel ch.0, the plurality of pieces of write data including the 64-B write data are written in the program buffer corresponding to the channel ch.0. The plurality of pieces of write data including the 64-B write data, which are written to the program buffer, are written to the write destination region. The page table 71 is then updated by the write controller 521, and the physical address indicating a storage location in the write destination region where the 64-B write data is written is stored in the entry corresponding to the logical address of the 64-B write data. Note that the process of storing the physical address in the entry corresponding to the logical address of the 64-B write data may be executed at the time at which the write-back of the 64-B write data is requested by the cache control logic 511.

Next, the refill operation executed by the read controller 522 will be described. In the refill operation, the bank to which the logical address of the 64-B read target data belongs is identified by the read controller 522. In addition, the physical address corresponding to the logical address of the 64-B read target data is obtained from the page table 71 by the read controller 522. The 64-B read target data is then read from a region of the NAND flash memory 6 corresponding to the identified bank based on the identified bank and the obtained physical address. The read 64-B read target data is stored in one cache line and then transmitted to the host 2. Note that in the case in which the 64-B read target data is stored in the write buffer 72, the 64-B read target data is read from the write buffer 72. The read 64-B read target data is stored in one cache line and then transmitted to the host 2.

Next, the garbage collection operation executed by the GC controller 523 will be described. In the garbage collection operation, valid data stored in the GC source block is read by the GC controller 523. The read valid data is transmitted to the write controller 521. The write controller 521 executes a process of writing the received valid data to the GC destination block.

Next, a plurality of banks will be described. FIG. 6 is a diagram illustrating a relationship between components provided in the memory system 3 according to the embodiment and the plurality of banks.

The plurality of banks are $2^N$ small logical address spaces. The banks 1 to 8K in FIG. 6 are formed by dividing the entire logical address space into 8K ($=2^{13}$). In the case in which the logical address space of 256 GB is divided into 8K banks, each of the 8K banks has a capacity of 32 MB. The 8K banks, from bank 1 to bank 8K, have a one-to-one correspondence with the 8K ($=2^{13}$) regions, from region 1 to region 8K, obtained by dividing the physical storage area of the NAND flash memory 6. The 8K banks, from bank 1 to bank 8K, also have a one-to-one correspondence with the 8K ($=2^{13}$) entry groups of the page table 71.

Further, the 8K banks, from bank 1 to bank 8K, have a one-to-one correspondence with the 8K ($=2^{13}$) 32-KB write buffers (w-buffer 1 to w-buffer 8K) of the write buffer 72.

Each of the 8K regions, from region 1 to region 8K, is a non-overlapping storage area. Therefore, in the case in which the capacity of the NAND flash memory 6 is 512 GB, each region, i.e., the storage area corresponding to each bank has a capacity of 64 MB. The page table 71 includes an entry group corresponding to each bank. In addition, 8K banks and 8K regions correspond to each other on one-to-one. Therefore, the physical address stored in each entry of the page table 71 only needs to specify a storage location within the corresponding region, and does not have to include information for specifying the region. As a result, it is possible to reduce the bit width of the physical address stored in each entry of the page table 71 according to the number of divided banks.

In this manner, the 8K banks, from bank 1 to bank 8K, correspond to the 8K regions, from region 1 to region 8K, respectively. Therefore, data having a logical address belonging to a certain bank is written to only a region corresponding to the bank. In addition, writing to the regions is not allowed to be started until data in a size corresponding to the write size is prepared. Therefore, a write buffer having a capacity (here, 32 KB) corresponding to the write size is necessary for each bank. In the present embodiment, the 8K 32-KB write buffers (the w-buffer 1 to the w-buffer 8K) included in the write buffer 72 correspond to the 8K banks 1 to 8K, respectively. The data output from the cache 51 is stored in the 32-KB write buffer (w-buffer) corresponding to the bank to which a logical address corresponding to the data belongs. When pieces of data having a size corresponding to the write size are then stored in the 32-KB write buffer (w-buffer), these pieces of data are written to the region corresponding to the bank to which these logical addresses belong.

Here, the capacity of the write buffer and the capacity of the page table in a normal configuration in which the logical address space is not divided, and the capacity of the write buffer and the capacity of the page table in the present embodiment will be described.

In a normal configuration in which the logical address space is not divided, the necessary capacity of the write buffer is expressed by the following formula. Capacity of write buffer="write size"×"number of parallel writes"

The write size is 32 KB (=4 KB×8) in the case in which the physical page size is 4 KB and the multiplane mode in which data is simultaneously written in eight planes is used. In the case in which data are written in parallel to the 32 flash dies connected to the 32 channels, the number of parallel writes is 32. Therefore, the necessary capacity (total capacity) of the write buffer is 1 MB (=32 KB×32). The capacity of the write buffer corresponds to the total capacity of the program buffer 73 in the present embodiment.

In the present embodiment, the necessary capacity of the write buffer 72 is expressed by the following formula.

Capacity of write buffer="write size"×"number of banks"

In the case in which the write size is 32 KB (=4 KB×8) and the number of $2^N$ banks is 8K, the necessary capacity of the write buffer 72 is expressed by the following formula.

Capacity of write buffer=32 KB×8K=256 MB

Therefore, the necessary capacity (total capacity) of the write buffer 72 is about several hundred times as large as "write size×parallel write number", i.e., at least ten times as large as "write size×parallel write number" or more.

Next, the size of the page table 71 will be described. Consider the case in which the capacity of the logical address space of the memory system 3 is 256 GB (=$2^{38}$ B). The capacity of the logical address space is the capacity (user capacity) of the memory system 3 visible from the host 2.

The address translation unit of the page table 71 is 64 B (=$2^6$ B). Therefore, the number of entries included in the page table 71 is 4 G entries, since 256 GB (entire logical address space)/64 B (address translation unit)=$2^{38-6}$=4 G. The bit width of the logical address corresponding to the 4 G entries is 32 bits.

The NAND flash memory 6 has a capacity equal to or larger than the capacity of the logical address space. For example, consider the case in which the capacity of the NAND flash memory 6 is 512 GB (=$2^{39}$ B). Since the address translation unit of the page table 71 is 64 B (=$2^6$ B), the bit width of the physical address capable of addressing the 512 GB physical address space in units of 64 B is 33 bits, since 512 GB (capacity of the storage area of the NAND flash memory 6)/64 B (address translation unit)=$2^{39-6}$=$2^{33}$.

In the present embodiment, the logical address space is divided into $2^N$ banks, and the $2^N$ banks and the $2^N$ regions correspond to each other on one-to-one. Therefore, it is sufficient for the individual entries of the page table 71 to store location information indicating any one of the storage locations included in one region as a physical address. The number of storage locations included in one region is $\frac{1}{2^N}$ of the number of storage locations included in the entire physical storage area of the NAND flash memory 6. Therefore, the bit width of the physical address stored in each entry can be reduced by N bits. In the case in which N=13, i.e., in the case in which the logical address space is divided into 8K banks, the bit width of the physical address that has to be stored in each entry is 20 bits (=33 bits–13 bits).

The capacity of the page table 71 is 10 GB, since 20 bits×4 G entries=10 GB. On the other hand, the capacity of the page table 71 in the case in which the logical address space is not divided is 16.5 GB, since 33 bits×4 G entries=16.5 GB. Therefore, it is possible to reduce the capacity of the page table 71 by 6.5 GB, since 16.5 GB–10 GB=6.5 GB.

In the present embodiment, the sum of the capacity of the page table 71 and the total capacity of the write buffer 72 is 10 GB+256 MB. On the other hand, in the case in which the logical address space is not divided, the sum of the capacity of the page table and the total capacity of the write buffer is 16.5 GB+1 MB. Therefore, by dividing the logical address space into $2^N$ banks, it is possible to reduce the capacity of the entire DRAM 7 necessary to store the page table 71 and the write buffer 72.

Here, although the case in which N=13, i.e., the case in which the logical address space is divided into 8K (=$2^{13}$) banks has been described, the number of banks (i.e., the value of N) can be set to any value. N may be set to a natural number of ten or more. In the case in which N is ten or more, it is possible to reduce the capacity of the page table 71 by 5 GB or more. The reduction amount of 5 GB is a reduction amount that is ten times the reduction amount of 0.5 GB of the page table 71 in the case in which N is 1. In the case in which N is 10, the number of banks is 1024, and thus the total capacity of the write buffer 72 is 32 MB (=32 KB×1024). The total capacity of 32 MB of the write buffer 72 is about 30 times "write size×parallel write number". Therefore, by setting N to ten or more, it is possible to sufficiently reduce the capacity of the entire DRAM 7 that has to store the page table 71 and the write buffer 72 as compared with the case in which the logical address space is not divided.

Next, the sub-region will be described. FIG. 7 is a diagram illustrating a relationship between components provided in the memory system 3 according to the embodiment, a plurality of banks, and a plurality of sub-regions.

Each of the 8K regions is divided into $2^M$ sub-regions. Here, M is a natural number. In FIG. 7, each region is divided into two sub-regions (M=1). Each entry group of the page table 71 corresponds to each region. The media control unit 52 refers to a logical address specified by a read/write access request from the host 2 to identify any of a plurality of sub-regions included in a region corresponding to a bank to which the logical address belongs, as a read/write target sub-region. For example, the media control unit 52 determines whether the logical address is even or odd, and in the case in which the logical address is an even number, the media control unit 52 identifies, as the read/write target sub-region, the sub-region 1 among the sub-regions included in a region corresponding to a bank to which the logical address belongs. In the case in which the logical address is an odd number, the media control unit 52 identifies, as the read/write target sub-region, the sub-region 2 among the sub-regions included in a region corresponding to a bank to which the logical address belongs. The physical address stored in each entry of the page table 71 specifies any one storage location among a plurality of storage locations included in one sub-region. That is, since the physical address of each entry of the page table 71 only has to specify a storage location in a sub-region, which is a region narrower than the region, the bit width of the physical address is reduced by M bits.

Specifically, in the case in which the capacity of the NAND flash memory 6 is 512 GB, the logical address space is divided into 8K ($=2^{13}$) regions, and each of the 8K ($=2^{13}$) regions is divided into 2 ($=2^1$) sub-regions, the bit width of the physical address stored in each entry of the page table 71 is 19 bits since 512 GB (storage area of the NAND flash memory 6)/8K (number of banks)/2(number of sub-regions in each region)/64 B (address translation unit)= $2^{38-13-1-6}=2^{19}$. That is, by dividing each region into two sub-regions, the bit width of the physical address per entry can be reduced by one bit. By reducing the bit width of the physical address per entry by one bit, in the page table 71 having the 4 G entries, a reduction effect of 0.5 GB can be obtained since one bit (the number of bits reduced in the address width of the physical address due to the division of the sub-region)×4 G (the number of entries of the page table 71)=0.5 GB. When the reduction effect obtained by dividing the entire logical address space into 8K banks is combined with the reduction effect of 0.5 GB, a total of reduction effect of 7.0 GB (=0.5 GB+6.5 GB) is obtained.

In the case in which M=4, the bit width of the physical address per entry can be reduced by four bits. By reducing the bit width of the physical address per entry by four bits, a reduction effect of four bits×4 G=2 GB can be obtained. When the reduction effect obtained by dividing the entire logical address space into 8K banks is combined with the reduction effect of 2 GB, a total of reduction effect of 8.5 GB (=2 GB+6.5 GB) is obtained.

Note that in the case in which N=14 is set, the necessary capacity of the write buffer 72 is twice 256 MB, which is the capacity of the write buffer 72 in the case of N=13, i.e., 512 MB. On the other hand, the reduction effect obtained by dividing the entire logical address space into 16 K banks is increased by 0.5 GB as compared with the case of N=13. Therefore, the sum of the capacity of the page table 71 and the capacity of the write buffer 72 is smaller in the 16K banks than in the 8K banks.

Figure 8:
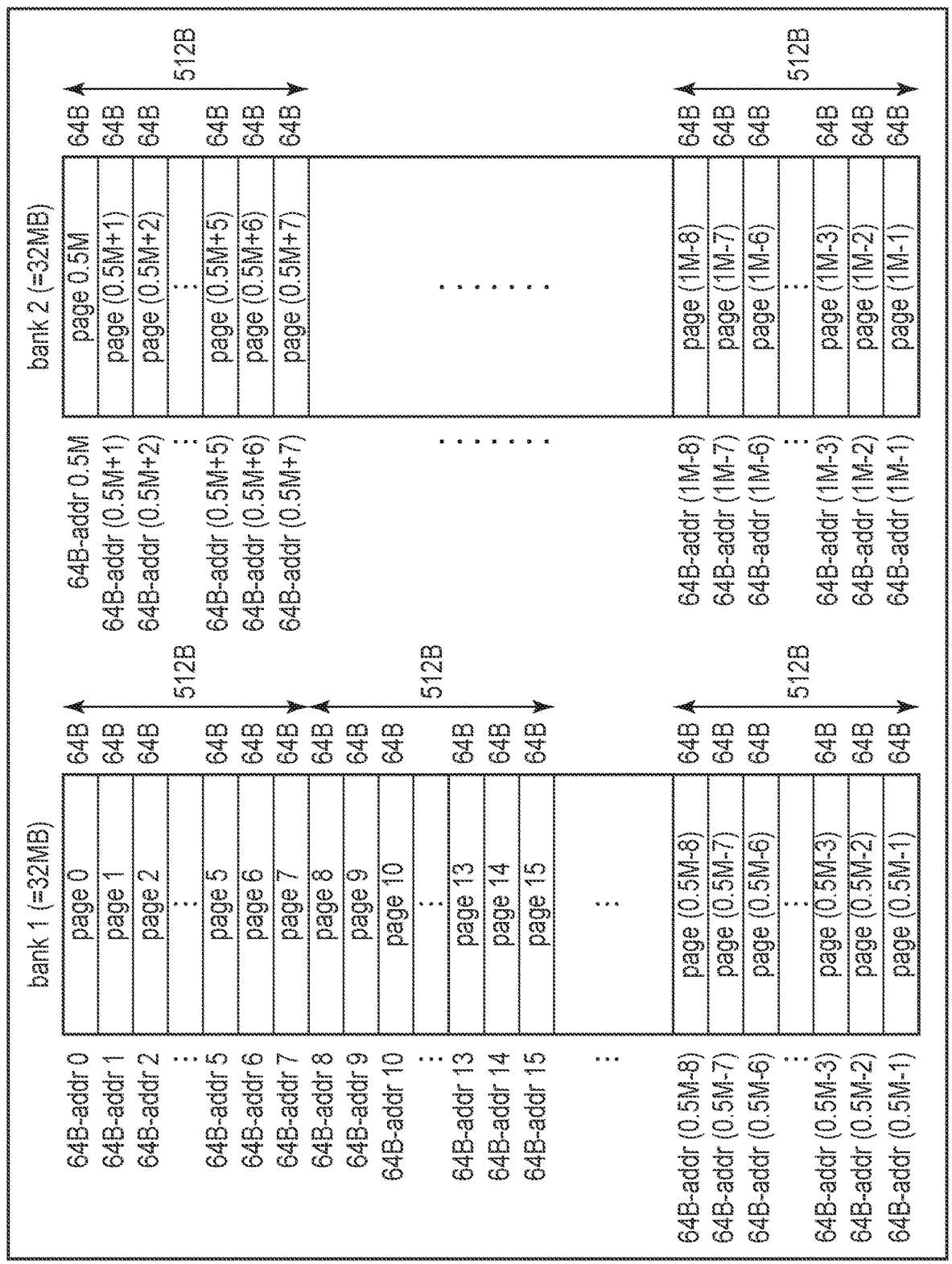
FIG. 8 is a diagram illustrating a logical address group belonging to each of banks used in the memory system according to the embodiment.

Next, the logical address group belonging to each bank will be described. FIG. 8 is a diagram illustrating a logical address group belonging to each bank used in the memory system 3 according to the embodiment. Here, the case is illustrated in which each of the banks has a logical address space of 32 MB and the address translation unit is 64 B.

0.5 M logical addresses which are contiguous in units of 64 B belong to the bank 1. Specifically, the logical address "64 B-addr 0", the logical addresses "64 B-addr 1", . . . , and the logical addresses "64 B-addr (0.5 M–1)" belong to the bank 1. The logical address "64 B-addr 0", the logical address "64 B-addr 1", and the logical address "64 B-addr (0.5 M–1)" correspond to page 0, page 1, . . . , and page (0.5 M–1).

In addition, the eight pieces of 64-B data belonging to the 512-B logical address range are stored in the same cache line in the cache 51. Where, the 512-B logical address range is an logical address range including the eight logical addresses which are contiguous in units of 64 B. For example, the eight pieces of 64-B data belonging to the 512-B logical address range corresponding to page 0 to page 7 are data that has to be stored in the same cache line. Similarly, the eight pieces of 64-B data belonging to the 512-B logical address range corresponding to pages 8 to 15 are also data to be stored in the same cache line, and the eight pieces of 64-B data belonging to the 512-B logical address range corresponding to pages (0.5 M–8) to (0.5 M–1) are also data that has to be stored in the same cache line.

0.5 M logical addresses which are contiguous in units of 64 B belong to the bank 2. Specifically, the logical address "64 B-addr 0.5 M", the logical addresses "64 B-addr (0.5 M+1)", . . . , and the logical addresses "64 B-addr (1 M–1)" belong to the bank 2. The logical address "64 B-addr 0.5 M", the logical address "64 B-addr (0.5 M+1)", . . . , and the logical address "64 B-addr (1 M–1)" correspond to page 0.5 M, page (0.5 M+1), . . . , and page (1 M–1).

Figure 9:
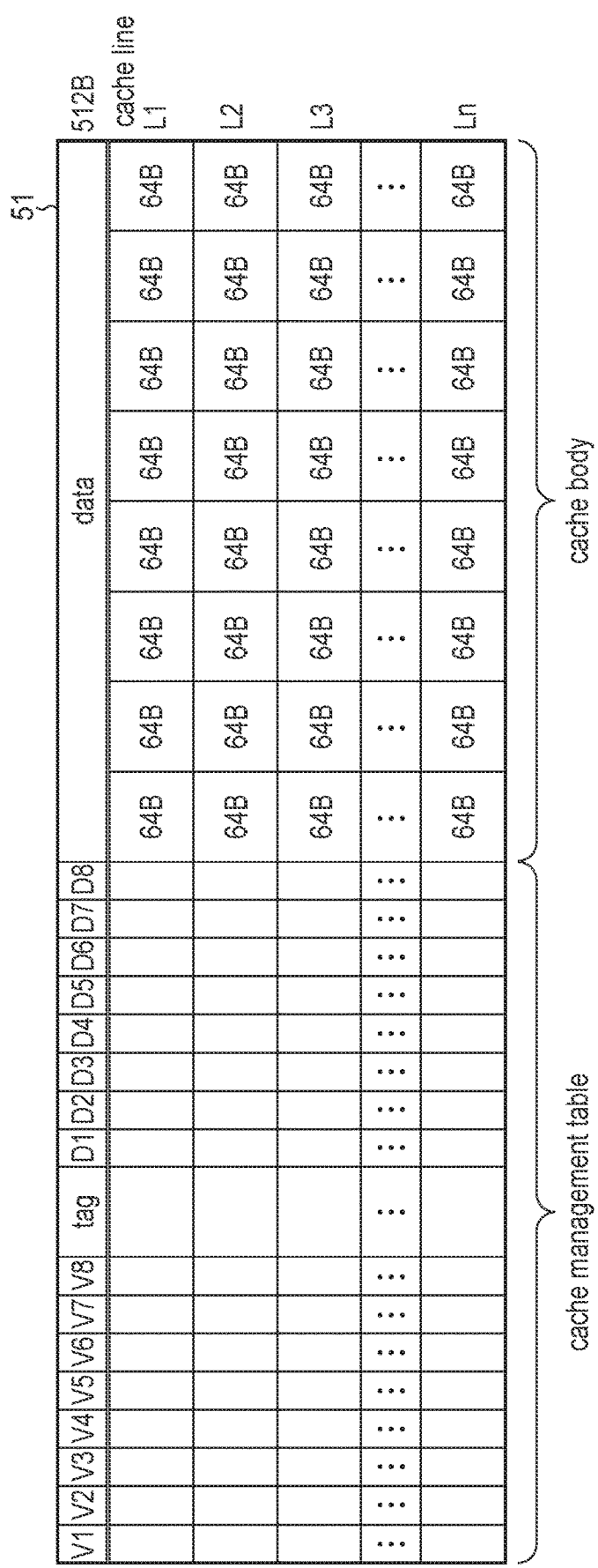
FIG. 9 is a diagram illustrating an example of a configuration of a cache included in the memory system according to the embodiment.

Next, an example of a configuration of the cache will be described. FIG. 9 is a diagram illustrating an example of a configuration of the cache 51 included in the memory system 3 according to the embodiment.

The cache 51 includes a cache body that stores data and a cache management table that stores information for managing the data stored in the cache 51.

The cache body is a memory that stores the data. The cache body includes n cache lines L1 to Ln. Each cache line has a size of 512 B. Therefore, each cache line has eight memory areas capable of storing eight 64-B data respectively.

The cache management table stores eight valid flags, a tag, and eight dirty flags, with respect to each of the cache lines. The eight valid flags respectively correspond to the eight memory areas in the corresponding cache line. Each of the eight valid flags is a flag indicating whether the corresponding memory area is valid. The valid memory area is an area that stores 64-B write data from the host 2 or 64-B read data read from the NAND flash memory 6. The tag indicates which 512-B logical address range corresponds to data stored in the corresponding cache line. The eight dirty flags respectively correspond to the eight storage areas in the corresponding cache line. Each of the eight dirty flags is a flag indicating whether the corresponding 64-B data is update data (dirty data) that needs to be written to the NAND flash memory 6.

Figure 10:
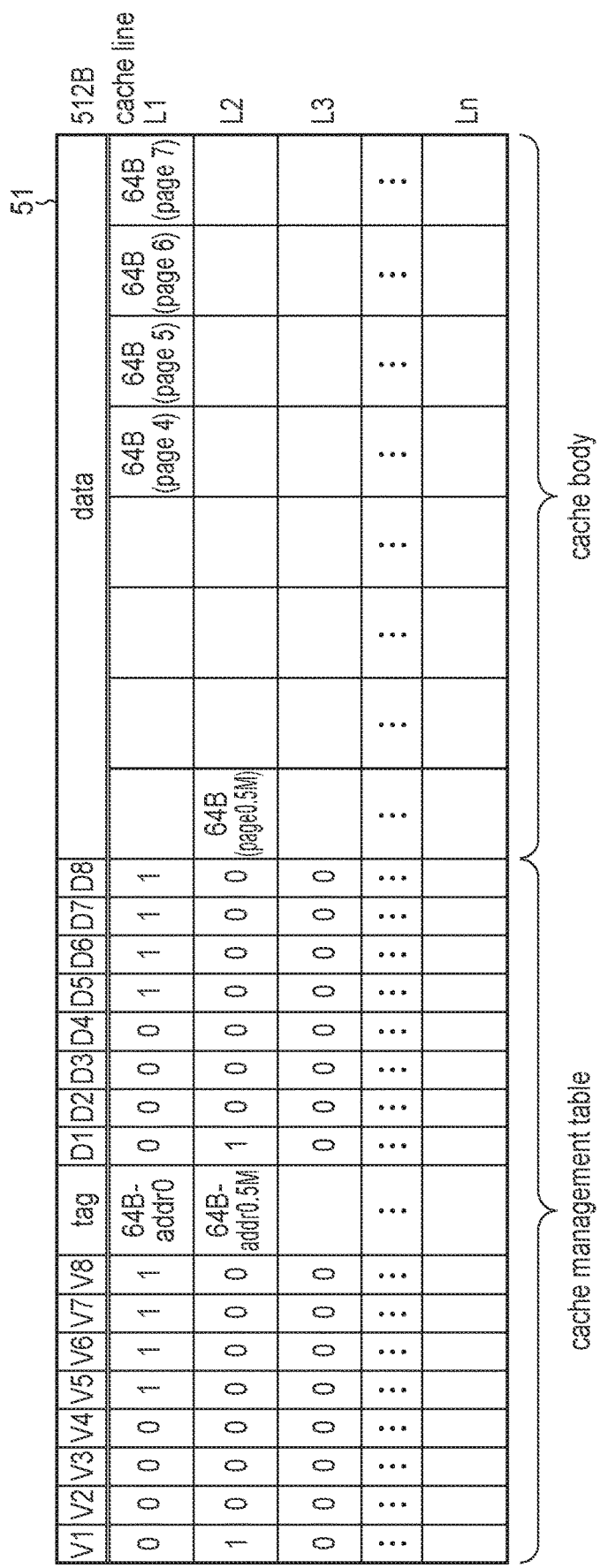
FIG. 10 is a diagram illustrating a state in which data is stored in the cache included in the memory system according to the embodiment.

FIG. 10 is a diagram illustrating a state in which data is stored in the cache included in the memory system 3 according to the embodiment. Four pieces of 64-B write data are stored in the cache line L1, and one piece of 64-B write data is stored in the cache line L2.

The cache line L1 stores four pieces of 64-B write data corresponding to page 4, page 5, page 6, and page 7, respectively. Since the four storage areas in the latter half of the cache line L1 store data, valid flags V5, V6, V7, and V8 of the cache line L1 are set to value "1" indicating validity. In addition, the tag corresponding to the cache line L1 indicates a top logical address "64 B-addr 0" of a 512 B address range including pages 0 to 7. Since four pieces of 64-B write data corresponding to page 4, page 5, page 6, and page 7 are data that need to be written to the NAND flash memory 6, the dirty flags D5, D6, D7, and D8 are set to value "1" indicating dirty.

In addition, the cache line L2 stores one piece of 64-B write data corresponding to page 0.5 M. Since the top storage area of the cache line L2 stores data, the valid flag V1 corresponding to the cache line L2 is set to value "1" indicating validity. In addition, the tag of the cache line L2 indicates a top logical address "0.5 B-addr M" of a 512 B address range including the page 0.5 M. Since one piece of 64-B write data corresponding to page 0.5 M is data that needs to be written to the NAND flash memory 6, the dirty flag D1 is set to value "1" indicating dirty.

Since data is not yet stored in the cache line L3, each of the valid flags V1 to V8 corresponding to the cache line L3 is set to value "0" indicating invalidity.

Figure 11:
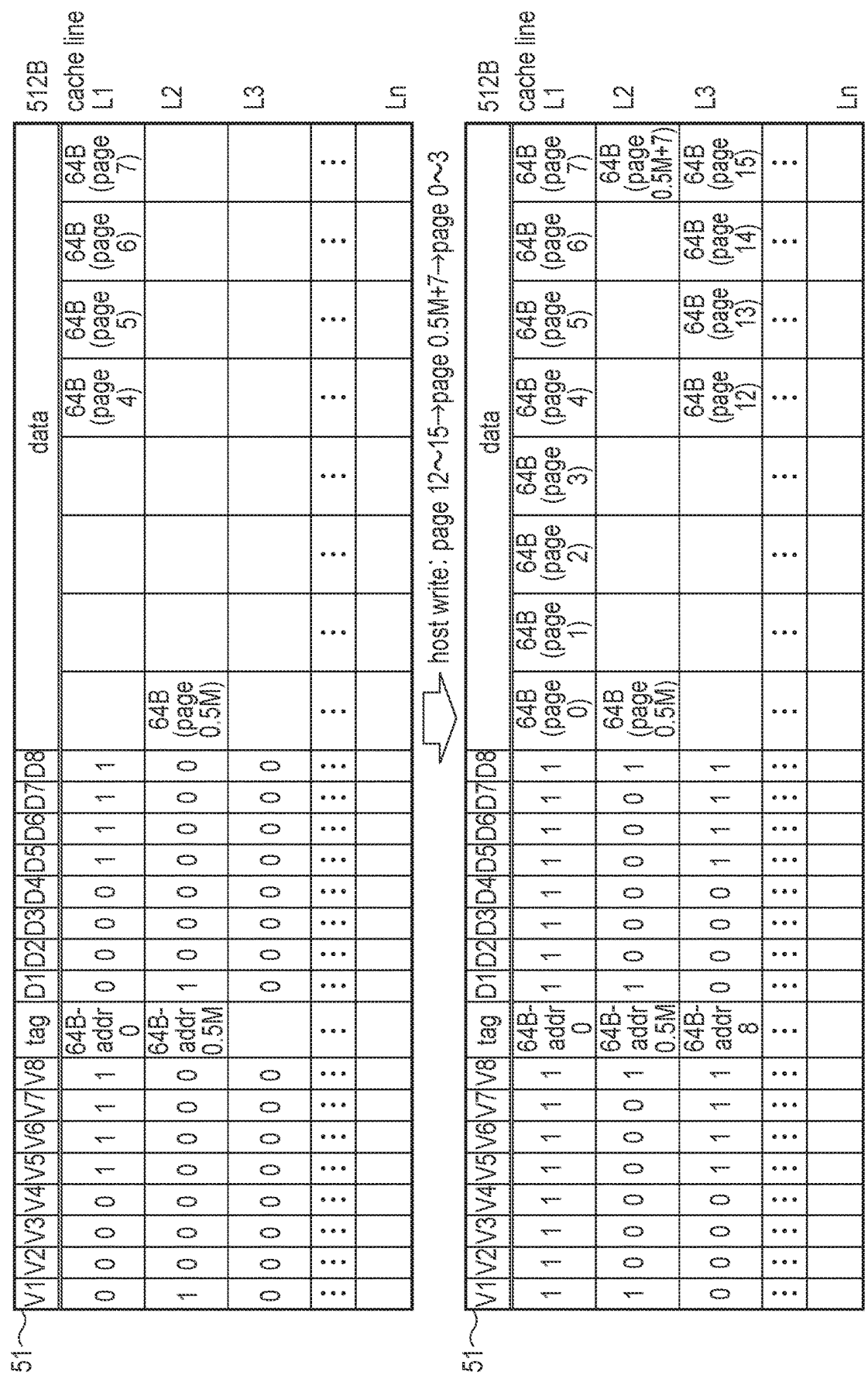
FIG. 11 is a diagram illustrating a state in which data is further stored in the cache included in the memory system according to the embodiment.

FIG. 11 is a diagram illustrating a state in which data is further stored in the cache 51 in the memory system 3 according to the embodiment. Here, the case will be described in which four pieces of 64-B write data corresponding to pages 12 to 15, one piece of 64-B write data corresponding to page (0.5 M+7), and four pieces of 64-B write data corresponding to pages 0 to 3 are stored in this order in the cache 51 described in FIG. 10 in response to the write requests from the host 2.

First, the four pieces of 64-B write data corresponding to pages 12 to 15 are stored in the latter four storage areas of the cache line L3, which is an available (free) cache line. The valid flags V5, V6, V7, and V8 corresponding to the cache line L3 are set to values indicating validity in response to writing of data to the four storage areas in the latter half of the cache line L3. The tag corresponding to the cache line L3 indicates the top logical address "64 B-addr 8" of the 512-B logical address range corresponding to pages 8 to 15. The dirty flags D5, D6, D7, and D8 corresponding to pages 12 to 15 are set to values indicating dirty.

Subsequently, one piece of 64-B write data corresponding to page (0.5 M+7) is stored in the storage area at the tail end of the cache line L2. As a result, the valid flag V8 of the cache line L2 is set to a value indicating validity. In addition, the dirty flag D8 of the cache line L2 is set to a value indicating dirty.

The four pieces of 64-B write data corresponding to pages 0 to 3 are then stored in the first four storage areas of the cache line L1. As a result, the valid flags V1, V2, V3, and V4 of the cache line L2 are set to values indicating validity. In addition, the dirty flags D1, D2, D3, and D4 of the cache line L1 are set to values indicating dirty.

Figure 12:
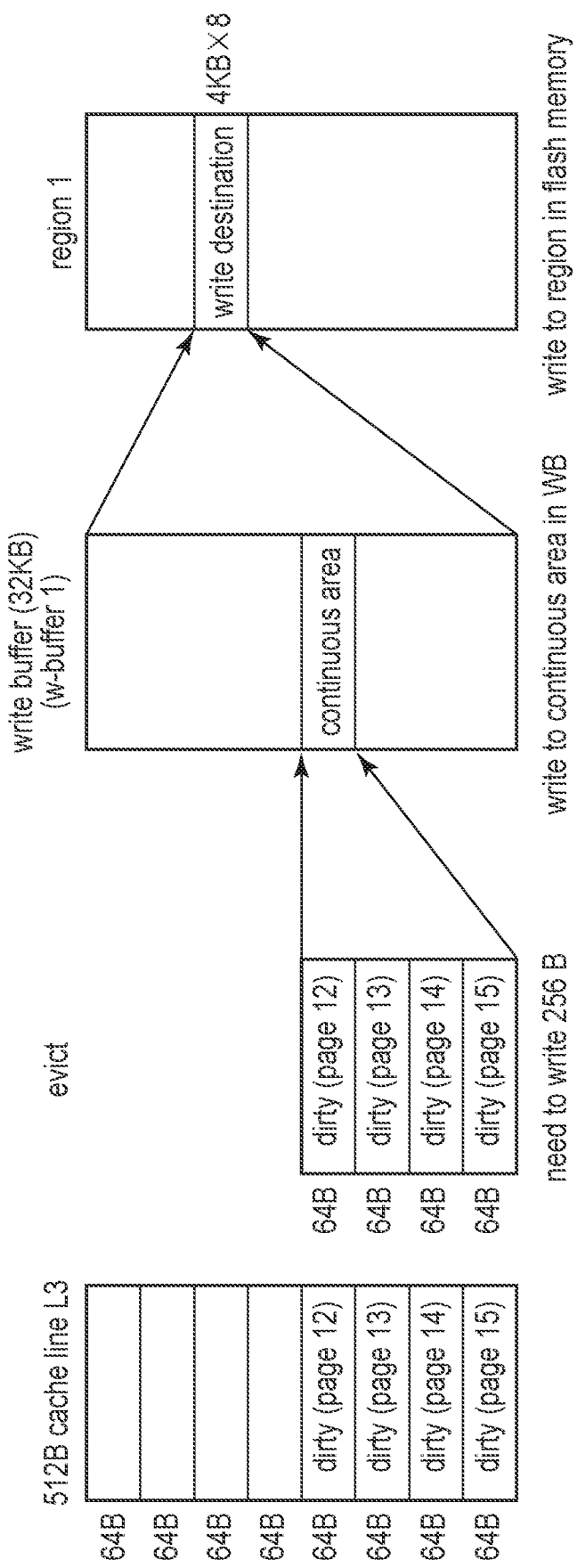
FIG. 12 is a diagram illustrating a write-back operation executed in the memory system according to the embodiment.

Next, the write-back operation will be described. FIG. 12 is a diagram illustrating the write-back operation executed in the memory system 3 according to the embodiment. Here, the case in which four pieces of 64-B write data corresponding to pages 12 to 15 stored in the cache line L3 in FIG. 11 are written back will be described.

The cache line L3 is selected as a cache line for write-back or eviction. In this case, since the dirty flags D5 to D8 of the cache line L3 are 1, the controller 5 recognizes that it is necessary to write the four pieces of 64-B write data corresponding to pages 12 to 15 stored in the cache line L3 to the NAND flash memory 6.

The four pieces of 64-B write data corresponding to pages 12 to 15 are 256-B data corresponding to four contiguous logical addresses. These four logical addresses all belong to the bank 1. Therefore, the controller 5 reserves a continuous area having a size of 256 B in the 32-KB write buffer (w-buffer 1) corresponding to the bank 1. The controller then writes the four pieces of 64-B write data corresponding to pages 12 to 15 (i.e., the four pieces of 64-B write data corresponding to the four contiguous logical addresses) to the continuous area of 256 B reserved in the 32-KB write buffer w-buffer 1. The cache line L3 is then initialized, and the eight valid flags, the tag, and the eight dirty flags corresponding to the cache line L3 are reset. As a result, the cache line L3 becomes an available (free) cache line.

After the total size of the data stored in the write buffer (w-buffer 1) becomes equal to or larger than the certain size, for example, after the total size of the data stored in the write buffer (w-buffer 1) reaches 32 KB (write size), the 32-KB data stored in the write buffer (w-buffer 1) is written to the region 1, which is the storage area of the NAND flash memory 6 corresponding to the bank 1. The 32-KB data stored in the write buffer (w-buffer 1) are sequentially arranged in storage locations in the region 1, which are physically contiguous. Therefore, four pieces of 64-B write data corresponding to pages 12 to 15, i.e., four pieces of 64-B write data corresponding to four contiguous logical addresses are physically and continuously arranged in the storage area of the region 1. At this time, the operation for writing 32-KB data to the region 1 can be executed by a parallel write operation for physical pages×8 planes.

Next, the refill operation will be described. FIG. 13 is a diagram illustrating the refill operation executed in the memory system 3 according to the embodiment. Here, the case will be described in which four pieces of 64-B data corresponding to pages 12 to 15 written in the region 1 in FIG. 12 are collectively refilled.

The controller 5 searches the cache 51 based on a read access request specifying a logical address "64 B-addr 12" (page 12) received from the host 2.

In the case in which there is no read target data having the logical address "64 B-addr 12" (page 12) specified by the read access request in the cache 51, the controller 5 executes the refill process. The controller 5 selects one cache line as a cache line to be refilled. For example, in the case in which there is a cache line storing data belonging to the same 512-B logical address range as the read target data, this cache line is selected as a cache line to be refilled. In the case in which there is no cache line storing data belonging to the same 512-B logical address range as the read target data, a free cache line is selected as the cache line to be refilled. In the case in which there is no free cache line, the eviction process is executed and a free cache line is generated. After selecting the cache line to be refilled, the controller 5 refers to the page table 71 and obtains the physical address indicating a storage location of the NAND flash memory 6 where the read target data is stored. The controller 5 then determines whether data to be stored in the same cache line as the read target data is sequentially arranged in a plurality of storage locations of the NAND flash memory 6, which are physically contiguous. This determination can be performed by making reference to the page table 71. Here, four pieces of 64-B data corresponding to pages 12 to 15 are sequentially arranged in a plurality of storage locations in the region 1, which are physically contiguous. Therefore, the controller 5 collectively reads the four pieces of 64-B data corresponding to pages 12 to 15 from the NAND flash memory 6, and stores the read four pieces of 64-B data in the cache line to be refilled. In the cache line to be refilled, four valid flags corresponding to the four 64 data are set to values indicating validity.

Next, an operation of writing two pieces of 64-B data (i.e., 128-B data) corresponding to two contiguous logical addresses to any region will be described. FIG. 14 is a diagram illustrating 16 bit first location information applied to 64 byte data and 32 bit second location information applied to 128 byte data, which are used in the memory system 3 according to the embodiment.

Each entry of the page table 71 stores a physical address indicating a storage location in the NAND flash memory 6 in which data corresponding to a logical address corresponding to the entry is stored.

Here, for example, in the case in which N=13 and M=4, the bit width of the physical address per entry is 16 bits.

For example, in the case in which 64-B data corresponding to entry #1 and 64-B data corresponding to entry #2 are written to continuous storage areas, the page table 71 uses 32 bits obtained by integrating entry #1 with entry #2 to manage a storage location of the 128-B data written to the continuous storage areas. The page table 71 may manage a flag indicating that two entries are integrated. At this time, since the bit width that can be used is increased by integrating the two entries, the physical address stored in the two integrated entries can specify not only the storage location in the region corresponding to the bank but also the storage location included in any region. Therefore, it is possible to select, from the $2^N$ regions, a region to which 128-B data are to be written, based on the write amount of each of the $2^N$ regions. As a result, it is possible to prevent the concentration of writes in only a part of the plurality of regions and the difference in the amount of writes between the regions. In addition, the page table 71 may integrate three or more entries.

Next, a write-back process in the case in which 64-B write data is evicted from the cache line for eviction and a write-back process in the case in which two pieces of 64-B write data (i.e., 128-B write data) corresponding to two contiguous logical addresses are written back or evicted from the cache line for eviction will be described.

When evicting the 64-B write data from the cache line for eviction, the controller 5 identifies a bank to which the logical address of the 64-B write data belongs among the $2^N$ banks. The controller 5 writes the 64-B write data to one region corresponding to the identified bank through the write buffer 73 (one of the w-buffer 1 to the w-buffer 8K) corresponding to the identified bank. With the use of one entry of the page table 71 corresponding to the logical address of the 64-B write data, the controller 5 stores the location information having the first bit width (16-bit width) indicating the storage location in the region where the 64-B write data is written, in the page table 71. In this manner, the 64-B write data is written to only the region corresponding to the bank to which the logical address belongs.

When evicting two pieces of 64-B write data (i.e., 128-B write data) corresponding to two contiguous logical addresses from the cache line for eviction, the controller 5 selects, from the $2^N$ regions, one region to which two pieces of 64-B write data are to be written, based on the write amount of each of the $2^N$ regions. The controller 5 writes the two pieces of 64-B write data to the selected region through the write buffer 73 (one of the w-buffer 1 to the w-buffer 8K) corresponding to the selected region such that the two pieces of 64-B write data are sequentially arranged in two storage locations which are included in the selected region and are physically contiguous. The controller 5 stores the second location information having the second bit width (32-bit width) indicating both the selected region and the storage location in the selected region in which the two pieces of 64-B write data are written, in the page table 71 using two entries of the page table 71 corresponding to two logical addresses of the two pieces of 64-B write data.

In this manner, by managing the physical address of the 128-B write data using the two entries, it is possible to write the 128-B write data to a region having a small write amount in consideration of the write amount of each of the $2^N$ regions. As a result, it is possible to level the write amount of each of the $2^N$ regions, it is possible to maximize the life of the memory system 3, and it is possible to improve the write performance. Note that the criterion used to select the region is not limited to the write amount of each of the $2^N$ regions, and any predetermined criterion can be used. For example, in order to temporarily avoid concentration of read/write accesses, a configuration that selects a region other than the region being accessed may be used. In addition, although the write-back process in the case in which data is evicted from the cache line for eviction has been described here, the write-back process in the case in which data is written back from the cache line for wrote-back to the NAND flash 6 is also executed in a similar procedure.

In addition, it is also made possible to write two pieces of 64-B data (i.e., 128-B data) corresponding to two consecutive logical addresses to any sub-region. In this case, the write-back process in the case in which 64-B write data is evicted from the cache line for eviction and the write-back process in the case in which two pieces of 64-B write data (i.e., 128-B write data) corresponding to two contiguous logical addresses are evicted from the cache line for eviction are executed as follows.

When evicting the 64-B write data from the cache line for eviction, the controller 5 identifies a bank to which the logical address of the 64-B write data belongs among the $2^N$ banks. The controller 5 writes the 64-B write data to one sub-region among $2^N$ sub-regions included in one region corresponding to the identified bank. The one sub-region is determined from the logical address of the 64-B write data. With the use of one entry of the page table 71 corresponding to the logical address of the 64-B write data, the controller 5 stores first location information having a first bit width (16-bit width) indicating a storage location in one sub-region in which the 64-B write data is written, in the page table 71. That is, the 64-B write data is written in one sub-region determined from the logical address among the $2^M$ sub-regions included in the region corresponding to the bank to which the logical address belongs.

When evicting two pieces of 64-B write data (i.e., 128-B write data) corresponding to two consecutive logical addresses from the cache line for eviction, the controller 5 identifies a bank to which the two logical addresses of the two pieces of 64-B write data belong together among the $2^N$ banks. Based on the write amount of each of the $2^M$ sub-regions included in one region corresponding to the identified bank, the controller 5 selects a sub-region to which two pieces of 64-B write data are to be written, from these $2^M$ sub-regions. The controller 5 writes the two pieces of 64-B write data to the selected sub-region such that the two pieces of 64-B write data are sequentially arranged in two storage locations which are included in the selected sub-region and are physically contiguous. With the use of two entries of the page table 71 corresponding to two logical addresses of the two pieces of 64-B write data, the controller 5 stores second location information having a second bit width (32-bit width) indicating both the selected sub-region and a storage location in the selected sub-region in which the two pieces of 64-B write data are written, in the page table 71. Note that the criterion used to select the sub-region is also not limited to the write amount of each of the 2 M sub-regions, and any predetermined criterion can be used. In addition, although the write-back process in the case in which data is evicted from the cache line for eviction has been described, the write-back process in the case in which data is written back from the cache line for write-back is also executed in a similar procedure.

Next, the preparation process of the memory system 3 will be described. FIG. 15 is a flowchart illustrating a procedure of the preparation process executed in the memory system 3 according to the embodiment.

The controller 5 manages 8K banks obtained by dividing the entire logical address space and 8K regions obtained by dividing the entire physical storage area of the NAND flash memory 6 (Step S101).

The controller 5 stores, in the DRAM 7, the page table 71 that manages mapping between each of the logical addresses belonging to the logical address space and each of location information in units of 64 B (Step S102). Each of the location information indicates a location in the physical storage area of the NAND flash memory 6. In this case, all the entries of the page table 71 are stored in the DRAM 7.

The controller 5 allocates the 8K write buffers 72 (the w-buffer 1 to the w-buffer 8K) corresponding one-to-one to the 8K banks to the DRAM 7 (Step S103).

Next, a data write operation to the NAND flash memory 6 will be described. FIG. 16 is a flowchart illustrating a procedure of a process of writing data to a region through the write buffer 72, executed in the memory system 3 according to the embodiment.

The controller 5 receives a write access request and write data from the host 2 (Step S201).

The controller 5 identifies a bank including a logical address corresponding to the received write data among the 8K banks obtained by dividing the entire logical address space (Step S202).

The controller 5 stores the received write data in the write buffer 72 (one of the w-buffer 1 to the w-buffer 8K) corresponding to the bank identified in Step S202 (Step S203).

The controller 5 determines whether the total size of the write data stored in the write buffer 72 (one of the w-buffer 1 to the w-buffer 8K) corresponding to the identified bank reaches the write size (Step S204).

In the case in which the total size of the write data stored in the write buffer 72 (one of the w-buffer 1 to the w-buffer 8K) corresponding to the identified bank reaches the write size (Yes in Step S204), the controller 5 writes the write data stored in the write buffer 72 (one of the w-buffer 1 to the w-buffer 8K) corresponding to the identified bank to the region corresponding to the identified bank (Step S205).

In the case in which the total size of the write data stored in the write buffer 72 (one of the w-buffer 1 to the w-buffer 8K) corresponding to the identified bank does not reach the write size (No in Step S204), the controller 5 waits until receiving a next write access request.

Note that here, an example is described in which writing to the region is started when the total size of the write data stored in the write buffer 72 (one of w-buffer 1 to w-buffer 8K) corresponding to the identified bank reaches the write size. However, the writing to the region may be executed after the total size of the write data stored in the write buffer 72 (one of w-buffer 1 to w-buffer 8K) becomes equal to or larger than a certain size (threshold size).

Next, a write process using the cache 51 will be described. FIG. 17 is a flowchart illustrating a procedure of the write process executed in the memory system 3 according to the embodiment.

The controller 5 determines whether there is a cache line storing data belonging to the same 512-B logical address range as the write data corresponding to the received write access request (Step S301). That is, the controller 5 determines whether there is a cache line in which data be stored in the same cache line as the write data corresponding to the received write access request is already stored.

In the case in which there is a cache line in which data belonging to the same 512-B logical address range as the write data is stored (Yes in Step S301), the controller 5 stores the write data in this cache line (Step S302).

The controller 5 sets the dirty flag corresponding to the write data stored in the cache line to a value indicating dirty (Step S303).

The controller 5 sets the valid flag corresponding to the write data stored in the cache line to a value indicating validity (Step S304).

In the case in which there is no cache line storing data belonging to the same 512-B logical address range as the write data (No in Step S301), the controller 5 determines whether there is an available (free) cache line in the cache lines included in the cache 51 (Step S305). The controller 5 determines whether there is a cache line in which all eight valid flags are set to a value indicating invalidity in the cache lines included in the cache 51.

In the case in which there is a free cache line (Yes in Step S305), the controller 5 stores the write data in the free cache line (Step S306).

The controller 5 sets the dirty flag corresponding to the stored write data to a value indicating dirty (Step S307).

The controller 5 sets the valid flag corresponding to the stored write data to a value indicating validity (Step S308).

In the case in which there is no free cache line (No in Step S305), the controller 5 executes the eviction process including a process of selecting any one cache line as a cache line for eviction and a process of writing back dirty data stored in the cache line for eviction (Step S309).

The controller 5 stores the write data in the free cache line created by the eviction process in Step S309 (Step S306).

The controller 5 sets the dirty flag corresponding to the stored write data to a value indicating dirty (Step S307).

The controller 5 sets the valid flag corresponding to the stored write data to a value indicating validity (Step S308).

Figure 18:
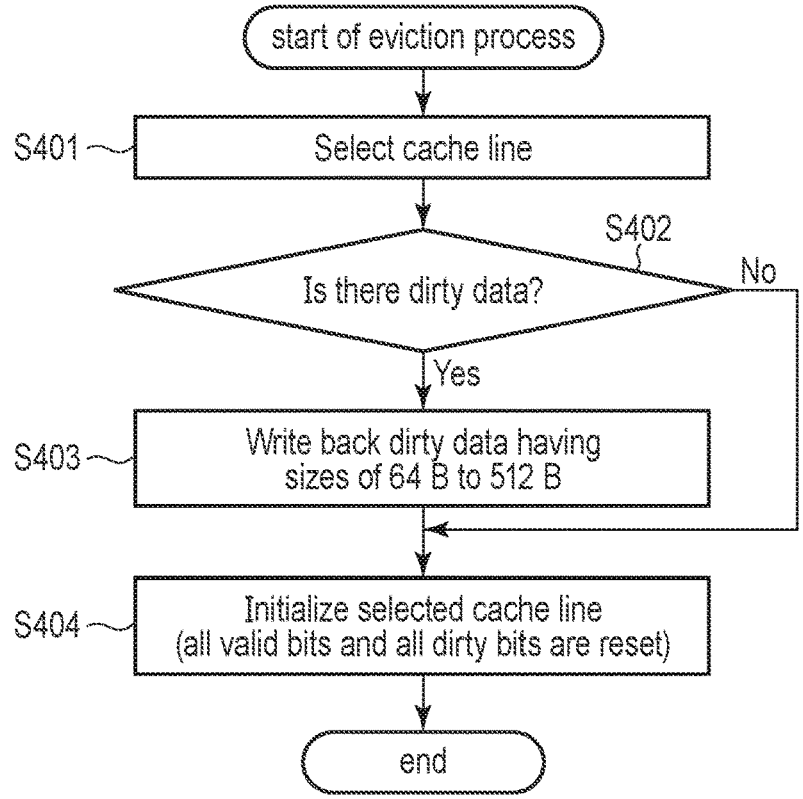
FIG. 18 is a flowchart illustrating a procedure of an eviction process executed in the memory system according to the embodiment.

Next, the eviction process will be described. FIG. 18 is a flowchart illustrating a procedure of the eviction process executed in the memory system 3 according to the embodiment.

The controller 5 selects a cache line for eviction (Step S401). The controller 5 can select the cache line for eviction using any algorithm.

The controller 5 determines whether dirty data is stored in the cache line selected in Step S401 (Step S402). The controller 5 refers to the dirty flags corresponding to the selected cache line to determine whether there is data corresponding to the dirty flag set to a value indicating dirty.

In the case in which the dirty data is stored in the selected cache line (Yes in Step S402), the controller 5 writes back the dirty data having the sizes of 64 B to 512 B (Step S403). The controller 5 writes dirty data corresponding to each dirty flag set to a value indicating dirty to the physical storage area of the NAND flash memory 6. Note that there may be the case in which valid data other than the dirty data is included in the data to be written back. For example, in a certain cache line, in the case in which the valid flag of 8 bits is "11110000" and the dirty flag of 8 bits is "10110000", the first four pieces of 64-B data (i.e., 256-B data) of the cache line may be written to the physical storage area of the NAND flash memory 6.

After the dirty data is written back, the controller 5 initializes the selected cache line for eviction (Step S404). In this case, the controller 5 resets all valid bits of the selected cache line for eviction and resets all dirty bits of the selected cache line for eviction.

In the case in which the dirty data is not stored in the cache line selected as the cache line for eviction (No in Step S402), the controller 5 initializes the selected cache line for eviction (Step S404).

Figure 19:
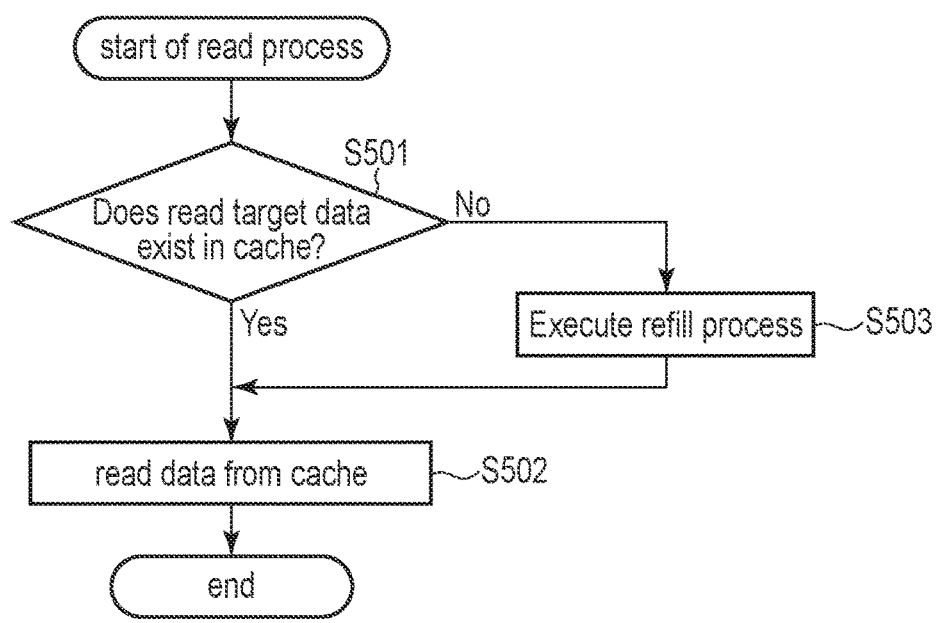
FIG. 19 is a flowchart illustrating a procedure of a read process executed in the memory system according to the embodiment.

Next, the read process will be described. FIG. 19 is a flowchart illustrating a procedure of the read process executed in the memory system 3 according to the embodiment.

The controller 5 determines whether the read target data is stored in the cache 51 (Step S501). The controller 5 determines whether the read target data specified by the read access request received from the host 2 is stored in the cache 51. In this case, the controller 5 refers to the cache management table of the cache 51 and searches for a cache line having a tag that matches the logical address of the read target data specified by the read access request. In the case in which there is no cache line having a tag matching the logical address of the read target data, the read target data is not stored in the cache 51. In the case in which there is a cache line having a tag matching the logical address of the read target data, the controller 5 further refers to one valid flag determined from the logical address of the read target data among the eight valid flags of the cache line. The controller 5 can determine whether the read target data is stored in the cache line according to whether the valid flag is set to a value indicating validity.

In the case in which the read target data is stored in the cache 51 (Yes in Step S501), the controller 5 reads the read target data from the cache 51 (Step S502).

In the case in which the read target data is not stored in the cache 51 (No in Step S501), the controller 5 reads the read target data from the storage area of the NAND flash memory 6 and executes the refill process of storing the read target data in the cache 51 (Step S503). In the case in which the read target data is stored in the write buffer 72, the controller 5 may read the read target data from the write buffer 72.

The controller 5 then reads the read target data stored in the cache by the refill process from the cache 51 (Step S502).

Next, the refill process will be described. FIG. 20 is a flowchart illustrating a procedure of the refill process executed in the memory system 3 according to the embodiment.

The controller 5 determines whether there is a cache line in which data belonging to the same 512-B logical address space as the read target data is stored (Step S601). In the case in which there is a cache line in which data belonging to the same 512-B logical address space as the read target data is stored (Yes in Step S601), the controller 5 selects this cache line as a cache line to be refilled (Step S602).

In the case in which there is no cache line storing data belonging to the 512-B logical address space same as the read target data (No in Step S601), the controller 5 determines whether there is a free cache line in the cache 51 (Step S603). The controller 5 refers to the cache management table of the cache 51 and determines whether there is a cache line in which all valid flags are set to values indicating invalid.

In the case in which there is no free cache line in the cache 51 (No in Step S603), the controller 5 selects one arbitrary cache line and executes the eviction process in order to create a free cache line (Step S604).

In the case in which there is a free cache line in the cache 51 (Yes in Step S603), the controller 5 skips the eviction process in Step S604.

The controller 5 selects the free cache line as a cache line to be refilled (Step S605). The controller 5 then refers to the page table 71 and obtains the physical address of the read target data (Step S606).

The controller 5 determines whether data belonging to a logical address range to be stored in the same cache line as the read target data are sequentially arranged in contiguous physical addresses including the obtained physical address (Step S607).

In the case in which data belonging to a logical address range to be stored in the same cache line as the read target data are sequentially arranged in the contiguous physical addresses including the obtained physical address (Yes in Step S607), the controller 5 reads sequentially arranged data having sizes of 128 B to 512 B from the NAND flash memory 6 (Step S608).

The controller 5 stores the data read in Step S608 in the cache line to be refilled (Step S609).

The controller 5 sets the valid flag corresponding to each piece of 64-B data (each piece of refilled data) stored in the cache line to be refilled in Step S609 to a value indicating validity (Step S610).

Note that in the case in which the dirty 64-B data already exists in the cache line to be refilled, the controller 5 stores the data having the sizes of 128 B to 512 B read from the NAND flash memory 6 in the cache line to be refilled while avoiding the dirty 64-B data. As a result, it is possible to prevent the dirty 64-B data from being over-written by the refill process. In addition, the controller 5 does not necessarily have to store all the pieces of data read from one region, in the cache line, and can store only at least a part of the pieces of read data including the read target data in the cache line. For example, in the case in which the 512-B data including the read target data are sequentially arranged in a plurality of storage locations which are physically contiguous, the controller 5 may read the 512-B data from the region, and may store, in the cache line, only 256-B data including the read target data, among the read 256-B data. In addition, for example, in the case in which a cache configuration or the like having a variable cache line size is used, in addition to a configuration in which data having sizes of 128 B to 512 B read from the NAND flash memory 6 is stored in one cache line, a configuration in which data is stored using two or more cache lines can also be used.

In the case in which the data belonging to the logical address range to be stored in the same cache line as the read target data are not sequentially arranged in contiguous physical addresses including the obtained physical address (No in Step S607), the controller 5 reads only the read target data from the NAND flash memory 6 (Step S611).

The controller 5 stores the data read in Step S611 in the cache line to be refilled (Step S609).

The controller 5 sets the valid flag corresponding to the data read in Step S611 to a value indicating validity (Step S610).

Note that although the refill process executed in the case in which the read target data specified by the read access request from the host 2 does not exist in the cache 51 has been described here, the refill process can be executed by other factors. For example, in the case in which the 64-B data in the cache line is subjected to write access or read access by the host 2, the controller 5 can also internally execute the refill process of transferring data having a size of 448 B (=512 B−64 B) excluding the accessed 512-B data from the NAND flash memory 6 to the cache line (pre-fetch).

The data to be stored in the cache 51 by the refill process is data that needs to be read from the NAND flash memory 5. Therefore, the data to be stored in the cache 51 by the refill process is referred to as read data to be stored in the cache 51. Examples of the read data to be stored in the cache 51 include read target data specified by a read access request from the host 2 and pre-fetch target data.

Next, the access size and the address translation unit will be described. FIG. 21 is a diagram illustrating various management sizes used in the memory system 3 according to the embodiment.

The access size is a data size (granularity of data) of read data or write data corresponding to a read access request or a write access request transmitted from the host 2. The access request transmitted from the host 2 specifies a logical address indicating a multiple of 64. In the case of receiving a logical address (e.g., Addr 96) indicating a value other than a multiple of 64 from the host 2, the controller 5 notifies the host 2 of an error. The logical address (Addr 320) indicates five times 64. Therefore, the logical address (Addr 320) is handled as the sixth logical address "64 B-addr 5" among the six logical addresses "64 B-addr 0" to "64 B-addr 5" which are contiguous in units of 64 B.

In addition, the address translation unit of the page table 71 may be an integral multiple of 64 B (e.g., 64 B, 128 B, or 256 B). The address translation unit is the same as the access size or an integer multiple of the access size. That is, in the case in which the size (granularity) of data to be read/write-accessed by the host 2 is 64 B, the address translation unit is any one of 64 B, 128 B, and 256 B. In the case in which the size (granularity) of data to be read/write-accessed by the host 2 is 128 B, the address translation unit is 128 B or 256 B.

As described above, according to the present embodiment, the controller 5 manages $2^N$ banks obtained by dividing the logical address space used by the host 2. In addition, the controller 5 manages $2^N$ regions obtained by dividing the physical storage area of the NAND flash memory 6. The $2^N$ regions correspond to the $2^N$ banks on one-to-one. Further, the controller 5 manages $2^N$ write buffers 72 corresponding one-to-one to the $2^N$ banks. The write data having the logical address belonging to a certain bank among the $2^N$ banks is written to one region corresponding to this bank. Therefore, each of the entries of the page table 71 needs only store the location information indicating any one of the storage locations included in the region as the physical address, and does not need to store the location information for identifying the region in which the write data is written. In addition, the number of storage locations included in each region is smaller than the number of storage locations included in the entire NAND flash memory 6. Therefore, since the bit width of the physical address that has to be stored in each entry of the page table 71 is reduced, it is possible to reduce the capacity of the page table 71.

In addition, in the memory system 3 in which an increase in write amplification is suppressed by making the access granularity small, the number of entries of the page table 71 increases as the address translation size decreases. However, in the present embodiment, since the configuration is adopted in which the bit width of the physical address per entry is reduced, it is possible to minimize the amount of an increase in the size of the page table 71. Therefore, it is possible to allocate all the entries of the page table 71 on the DRAM 7.

Therefore, it is possible to realize the memory system 3 capable of supporting the fine access granularity while minimizing the amount of an increase in the size of the page table 71.

In addition, in the case in which a write access request and write data are received from the host 2, the controller 5 identifies a bank including a logical address specified by the write access request. The controller 5 stores the received write data in the write buffer 72 corresponding to the identified bank.

In the case in which the sum of the sizes of the write data stored in any one of the write buffers 72 reaches the write size, the controller 5 writes the write data stored in the write buffer 72 to the region corresponding to the bank corresponding to the write buffer 72.

As a result, the controller 5 is capable of preventing a plurality of pieces of write data respectively corresponding to logical addresses belonging to different banks from being stored in the same write buffer 72. Therefore, the controller 5 is also capable of supporting 64-B random write access for a wide logical address range across all banks.

Note that in the present embodiment, an example is mainly described in which a logical address is directly translated into a physical address using the page table 71. However, it is also possible to use a configuration in which a logical address is translated into virtual location information such as an offset within the region by first-stage address translation using the page table 71, and the virtual location information such as the offset within the region is translated into an actual physical address by second-stage address translation using another address translation table. In this case, each entry of the page table 71 may store the offset within the region, i.e., the location information indicating an offset from a top of the region to a storage location in the region where the data is written. Another address translation table may be stored in, for example, an SRAM in the controller 5.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host through a memory bus, the memory system comprising:
   a random access memory, a nonvolatile memory, and a controller, wherein
   the controller is configured to:
   manage $2^N$ banks that are $2^N$ small logical address spaces obtained by dividing a logical address space used by the host to access the memory system, and $2^N$ regions included in a physical storage area of the nonvolatile memory, the $2^N$ regions corresponding one-to-one to the $2^N$ banks, wherein N is a natural number;
   store at least part of an address translation table in the random access memory, the address translation table including a plurality of entries respectively corresponding to a plurality of logical addresses which are contiguous in units of a first size corresponding to granularity of data read/write-accessed by the host, the address translation table managing mapping between each of the plurality of logical addresses and each of a plurality of physical addresses of the physical storage area;
   allocate $2^N$ write buffers to the random access memory, the $2^N$ write buffers corresponding one-to-one to the $2^N$ banks, each of the $2^N$ write buffers having at least a first capacity corresponding to a write size of the nonvolatile memory;
   in response to receiving a write access request and first write data from the host, the write access request specifying a logical address of the first write data, identify a bank to which the logical address of the first write data belongs, and write the first write data to a write buffer corresponding to the identified bank among the $2^N$ write buffers; and
   after a total size of write data stored in the write buffer, including the first write data, becomes equal to or larger than a threshold size, write the write data including the first write data to a first region among the $2^N$ regions, the first region corresponding to the identified bank, and wherein each of the plurality of entries stores, as the physical address, location information indicating one of a plurality of first storage locations, the plurality of first storage locations being included in one region among the $2^N$ regions, the one region corresponding to one bank to which a logical address corresponding to the entry belongs, each of the plurality of entries does not store location information for identifying the one region, the nonvolatile memory includes a plurality of dies, a number of the $2^N$ banks is greater than a number of parallel writes, and the number of parallel writes indicates a number of dies on which write operation is executed in parallel.

2. The memory system according to claim 1, wherein the controller is configured to:

in response to receiving a read access request from the host, the read access request specifying a logical address of read target data, identify a bank to which the logical address of the read target data belongs among the $2^N$ banks, obtain location information stored in an entry of the address translation table corresponding to the logical address of the read target data, and read the read target data from a region corresponding to the identified bank based on the identified bank and the obtained location information.

3. The memory system according to claim 1, wherein the N is a natural number of ten or more.

4. The memory system according to claim 3, wherein a total capacity of the $2^N$ write buffers is 30 times or more a size represented by a product of the write size and the number of parallel writes.

5. The memory system according to claim 1, wherein each of the granularity of data read/write-accessed by the host and the first size has a size corresponding to a bus width of the memory bus.

6. The memory system according to claim 1, wherein the granularity of data read/write-accessed by the host is 64 bytes, and the first size is 64 bytes.

7. The memory system according to claim 1, wherein the granularity of data read/write-accessed by the host is 64 bytes, and the first size is any of 64 bytes, 128 bytes, or 256 bytes.

8. The memory system according to claim 1, wherein the granularity of data read/write-accessed by the host is 128 bytes, and the first size is any of 128 bytes or 256 bytes.

9. The memory system according to claim 1, wherein each of the $2^N$ regions includes $2^M$ sub-regions, M being a natural number, the controller is configured to:

determine, as a read/write target sub-region, one sub-region among the $2^M$ sub-regions included in a region corresponding to a bank to which a logical address specified by a read/write access request received from the host belongs, the one sub-region being determined from the logical address specified by the read/write access request, and each of the plurality of entries stores location information indicating any one of a plurality of storage locations included in one sub-region.

10. A memory system connectable to a host through a memory bus, the memory system comprising:

a random access memory, a nonvolatile memory, and a controller, wherein the controller is configured to:

manage $2^N$ banks that are $2^N$ small logical address spaces obtained by dividing a logical address space used by the host to access the memory system, and $2^N$ regions included in a physical storage area of the nonvolatile memory, the $2^N$ regions corresponding one-to-one to the $2^N$ banks, wherein N is a natural number;

store at least part of an address translation table in the random access memory, the address translation table including a plurality of entries respectively corresponding to a plurality of logical addresses which are contiguous in units of a first size corresponding to granularity of data read/write-accessed by the host, the address translation table managing mapping between each of the plurality of logical addresses and each of a plurality of physical addresses of the physical storage area;

allocate $2^N$ write buffers to the random access memory, the $2^N$ write buffers corresponding one-to-one to the $2^N$ banks, each of the $2^N$ write buffers having at least a first capacity corresponding to a write size of the nonvolatile memory;

in response to receiving a write access request and first write data from the host, the write access request specifying a logical address of the first write data, identify a bank to which the logical address of the first write data belongs, and write the first write data to a write buffer corresponding to the identified bank among the $2^N$ write buffers; and after a total size of write data stored in the write buffer, including the first write data, becomes equal to or larger than a threshold size, write the write data including the first write data to a first region among the $2^N$ regions, the first region corresponding to the identified bank, wherein each of the plurality of entries stores, as the physical address, location information indicating one of a plurality of first storage locations, the plurality of first storage locations being included in one region among the $2^N$ regions, the one region corresponding to one bank to which a logical address corresponding to the entry belongs, each of the plurality of entries does not store location information for identifying the one region, the nonvolatile memory includes a plurality of dies, a number of the $2^N$ banks is greater than a number of parallel writes, and the number of parallel writes indicates a number of dies on which write operation is executed in parallel, and wherein the memory system further comprises a cache, the controller is configured to:

store a plurality of pieces of write data corresponding to a plurality of contiguous logical addresses in one cache line among a plurality of cache lines included in the cache;

write, when the one cache line is selected as a cache line for write-back or eviction, the plurality of pieces of write data corresponding to the plurality of contiguous logical addresses to one region of the $2^N$ regions through one write buffer of the $2^N$ write buffers such that the plurality of pieces of write data corresponding to the plurality of contiguous logical addresses are sequentially arranged in a plurality of storage locations which are included in one region of the $2^N$ regions and are physically contiguous;

determine whether a plurality of pieces of data corresponding to a plurality of contiguous logical addresses and including first read data to be stored in the cache is sequentially arranged in a plurality of storage locations which are physically contiguous and included in one region corresponding to a bank to which a logical address of the first read data belongs; and read, when the plurality of pieces of data corresponding to the plurality of contiguous logical addresses and including the first read data are sequentially arranged in the plurality of storage locations which are physically contiguous and included in the one region, the plurality of pieces of data including the first read data from the one region, and store at least a part of the plurality of pieces of data in one or more cache lines of the cache lines, the part of the plurality of pieces of data including the first read data.

11. The memory system according to claim 10, wherein the controller is configured to:

identify, when writing back or evicting one piece of write data having the first size from the cache line for write-back or eviction, a bank among the $2^N$ banks to which a logical address of the one piece of write data belongs, write the one piece of write data to one region among the $2^N$ regions corresponding to the identified bank, and store, using one entry of the address translation table corresponding to the logical address of the one piece of write data, first location information having a first bit width in the address translation table, the first location information indicating a storage location in the one region where the one piece of write data is written; and select, when writing back or evicting two pieces of write data corresponding to two contiguous logical addresses, each of the two pieces of write data having the first size, from the cache line for write-back or eviction, a region among the $2^N$ regions in which the two pieces of write data are to be written based on a predetermined criterion, write the two pieces of write data to the selected region such that the two pieces of write data are sequentially arranged in a plurality of storage locations which are physically contiguous and are included in the selected region, and store, using two entries of the address translation table corresponding to two logical addresses of the two pieces of write data, second location information in the address translation table, the second location information having a second bit width larger than the first bit width, the second location information indicating both the selected region and a storage location in the selected region in which the two pieces of write data are written.

12. The memory system according to claim 10, wherein each of the $2^N$ regions includes $2^M$ sub-regions, wherein M is a natural number, and the controller is configured to:

determine, as a read/write target sub-region, one sub-region among the $2^M$ sub-regions included in a region corresponding to a bank to which a logical address specified by a read/write access request received from the host belongs, the one sub-region being determined from the logical address specified by a read/write access request, wherein each of the plurality of entries stores location information indicating any one storage location of a plurality of storage locations included in one sub-region;

identify, when writing back or evicting one piece of write data having the first size from the cache line for write-back or eviction, a bank among the $2^N$ banks to which a logical address of the one piece of write data belongs, write the one piece of write data in one sub-region among $2^M$ sub-regions included in one region corresponding to the identified bank, the one sub-region being determined from the logical address of the one piece of write data, and store, using one entry of the address translation table corresponding to the logical address of the one piece of write data, first location information having a first bit width in the address translation table, the first location information indicating a storage location in the one sub-region in which the one piece of write data is written; and identify, when writing back or evicting two pieces of write data corresponding to two contiguous logical addresses, each of the two pieces of write data having the first size, from the cache line for write-back or eviction, a bank among the $2^N$ banks to which the two logical addresses of the two pieces of write data belong together, select a sub-region in which the two pieces of write data are to be written from $2^M$ sub-regions included in one region corresponding to the identified bank based on a predetermined criterion, write the two pieces of write data to the selected sub-region such that the two pieces of write data are sequentially arranged in a plurality of storage locations which are physically contiguous and are included in the selected sub-region, and store, using two entries of the address translation table corresponding to the two logical addresses of the two pieces of write data, second location information in the address translation table, the second location information having a second bit width larger than the first bit width, the second location information indicating both the selected sub-region and a storage location in the selected sub-region to which the two pieces of write data are written.

13. The memory system according to claim 1, wherein the controller is configured to:

store all the entries included in the address translation table in the random access memory.

14. The memory system according to claim 10, wherein the N is a natural number of ten or more, and a total capacity of the $2^N$ write buffers is 30 times or more a size represented by a product of the write size and the number of parallel writes.

15. The memory system according to claim 10, wherein each of the granularity of data read/write-accessed by the host and the first size has a size corresponding to a bus width of the memory bus.

16. The memory system according to claim 10, wherein the granularity of data read/write-accessed by the host is 64 bytes, and the first size is 64 bytes.

17. The memory system according to claim 10, wherein the granularity of data read/write-accessed by the host is 64 bytes, and the first size is any of 64 bytes, 128 bytes, or 256 bytes.

18. The memory system according to claim 10, wherein the granularity of data read/write-accessed by the host is 128 bytes, and the first size is any of 128 bytes or 256 bytes.

19. The memory system according to claim 10, wherein each of the $2^N$ regions includes $2^M$ sub-regions, M being a natural number, the controller is configured to:

determine, as a read/write target sub-region, one sub-region among the $2^M$ sub-regions included in a region corresponding to a bank to which a logical address specified by a read/write access request received from the host belongs, the one sub-region being determined from the logical address specified by the read/write access request, and each of the plurality of entries stores location information indicating any one of a plurality of storage locations included in one sub-region.

20. The memory system according to claim 10, wherein the controller is configured to:

store all the entries included in the address translation table in the random access memory.

* * * * *